United States Patent
Nobutoki et al.

(10) Patent No.: US 11,209,123 B2
(45) Date of Patent: Dec. 28, 2021

(54) SUPPORT APPARATUS

(71) Applicant: AISIN SEIKI KABUSHIKI KAISHA, Kariya (JP)

(72) Inventors: Masashi Nobutoki, Kariya (JP); Shintaro Suzuki, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/914,767

(22) Filed: Jun. 29, 2020

(65) Prior Publication Data
US 2021/0003247 A1 Jan. 7, 2021

(30) Foreign Application Priority Data
Jul. 3, 2019 (JP) .............................. JP2019-124557

(51) Int. Cl.
*E04G 3/00* (2006.01)
*F16M 13/04* (2006.01)
*F16M 11/18* (2006.01)
*F16M 13/02* (2006.01)

(52) U.S. Cl.
CPC ............ *F16M 13/04* (2013.01); *F16M 11/18* (2013.01); *F16M 13/02* (2013.01)

(58) Field of Classification Search
CPC ......... F16M 13/04; F16M 11/18; F16M 13/02
USPC .............. 248/284.1, 220.21, 220.22, 222.51, 248/222.52, 292.12
See application file for complete search history.

(56) References Cited

U.S. PATENT DOCUMENTS

| | | | | |
|---|---|---|---|---|
| 3,740,011 A | * | 6/1973 | Dickson | ................ F16M 11/10 248/183.4 |
| 7,490,807 B2 | * | 2/2009 | Souza | .................... F16M 11/10 108/1 |

FOREIGN PATENT DOCUMENTS

| | | |
|---|---|---|
| JP | 7-54913 A | 2/1995 |
| JP | 2012-13126 A | 1/2012 |
| JP | 2018-52447 A | 4/2018 |

* cited by examiner

*Primary Examiner* — Todd M Epps
(74) *Attorney, Agent, or Firm* — Oblon, McClelland, Maier & Neustadt, L.L.P.

(57) ABSTRACT

A support apparatus includes a base member, an intermediate member, an upper member, a pair of first rails provided at the base member, the pair of first rails extending in a first direction, and a pair of second rails provided at the upper member, the pair of second rails extending in a second direction orthogonal to the first direction. The intermediate member includes a pair of first rollers engaging with the first rails and a pair of second rollers engaging with the second rails. The intermediate member constitutes a first pendulum mechanism that allows an oscillation of the upper member in the first direction and a second pendulum mechanism that allows an oscillation of the upper member in the second direction. The intermediate member includes a first drive portion that drives the first rollers to rotate and a second drive portion that drives the second rollers to rotate.

18 Claims, 18 Drawing Sheets

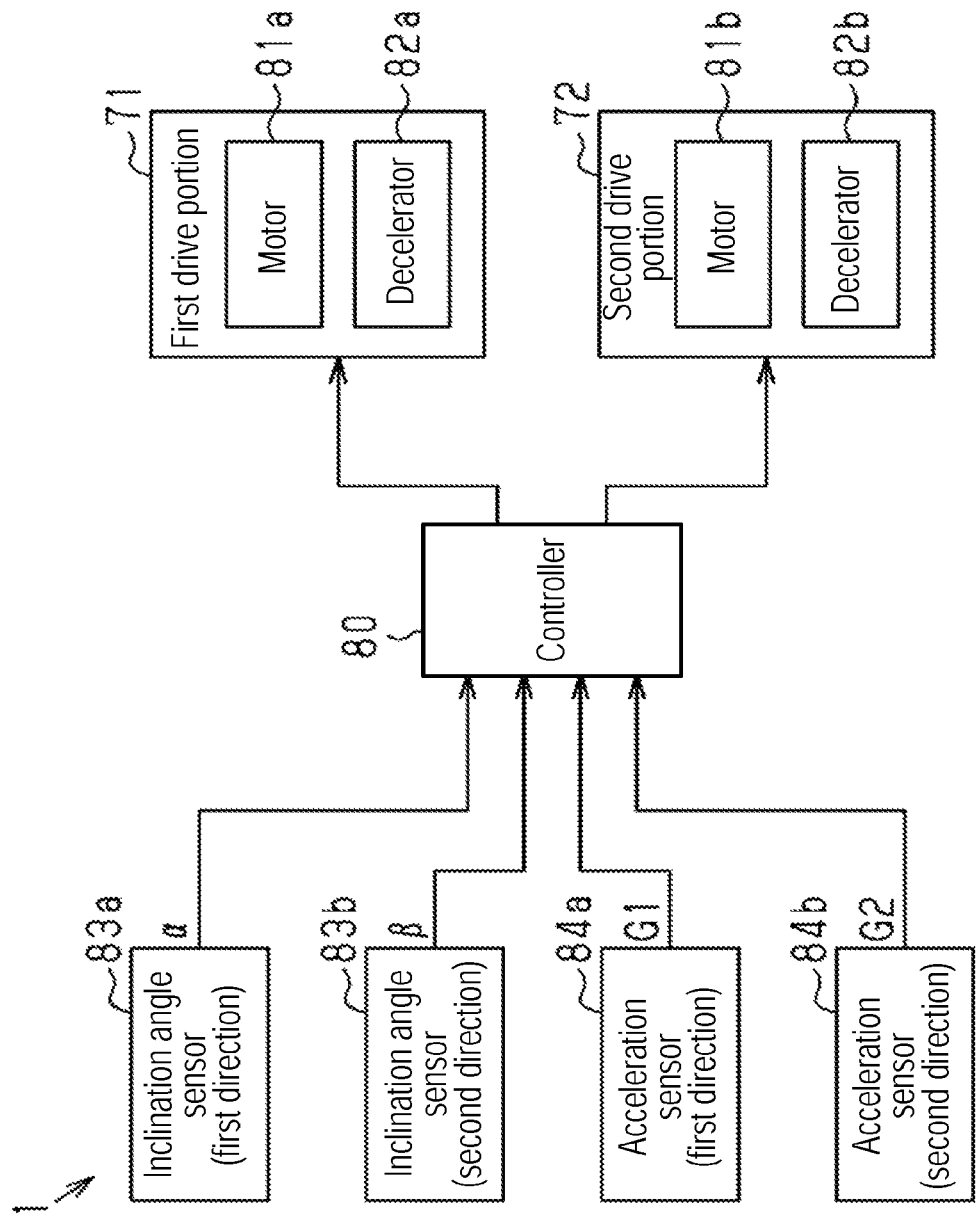
F I G. 27

SUPPORT APPARATUS

CROSS REFERENCE TO RELATED APPLICATIONS

This application is based on and claims priority under 35 U.S.C. § 119 to Japanese Patent Application 2019-124557, filed on Jul. 3, 2019, the entire content of which is incorporated herein by reference.

TECHNICAL FIELD

This disclosure generally relates to a support apparatus.

BACKGROUND DISCUSSION

A known support apparatus includes a pendulum mechanism disposed between a first element and a second element overlapping in an up and down direction. For example, JP2018-52447A discloses a seat apparatus including such pendulum mechanism disposed between a vehicle floor serving as the first element and a vehicle seat serving as the second element. The pendulum mechanism includes rails in a curving form with longitudinal opposed ends bending upward and rollers rolling on the rails. Additionally, JP2004-352196A discloses a vehicle including a pendulum mechanism disposed between an under body serving as the first element and an upper body serving as the second element. An oscillation (i.e., swingable movement) of the second element relative to the first element is allowed by the operation of the pendulum mechanism to thereby stably maintain a position of an object supported at an upper side of the second element, such as a passenger of the vehicle, for example, when acceleration is generated at the vehicle.

Further, JP2012-13126A discloses a first vibration damper and a second vibration damper overlapping in an up and down direction and respectively extending in a first direction and a second direction orthogonal with each other. Vibration damping effect is thus obtained in all direction on a plane including the first direction and the second direction.

In usage of the pendulum mechanism, a certain space is required for arranging the rails in a curving form. In a case where two vibration dampers in two directions are simply arranged overlapping each other, such as the aforementioned vibration dampers of direct acting type disclosed in JP2012-13126A, for example, dimensions in the up and direction may increase.

A need thus exists for a support apparatus which is not susceptible to the drawback mentioned above.

SUMMARY

According to an aspect of this disclosure, a support apparatus includes a base member, an intermediate member, an upper member supported at an upper side of the base member via the intermediate member, a pair of first rails provided at the base member and arranged in parallel to each other in a state where the intermediate member is disposed between the pair of first rails, the pair of first rails extending in a first direction, and a pair of second rails provided at the upper member and arranged in parallel to each other in a state where the intermediate member is disposed between the pair of second rails, the pair of second rails extending in a second direction orthogonal to the first direction. Each of the pair of first rails and the pair of second rails includes a curving form with longitudinal opposed ends curving upward. The intermediate member includes a pair of first rollers engaging with the pair of first rails and a pair of second rollers engaging with the pair of second rails. The intermediate member constitutes a first pendulum mechanism that allows an oscillation of the upper member in the first direction. The intermediate member constitutes a second pendulum mechanism that allows an oscillation of the upper member in the second direction. The intermediate member includes a first drive portion that drives the pair of first rollers to rotate and a second drive portion that drives the pair of second rollers to rotate.

BRIEF DESCRIPTION OF THE DRAWINGS

The foregoing and additional features and characteristics of this disclosure will become more apparent from the following detailed description considered with the reference to the accompanying drawings, wherein:

FIG. 27 is a block diagram of the support apparatus;

DETAILED DESCRIPTION

An embodiment is explained with reference to the attached drawings.

Figure 1:
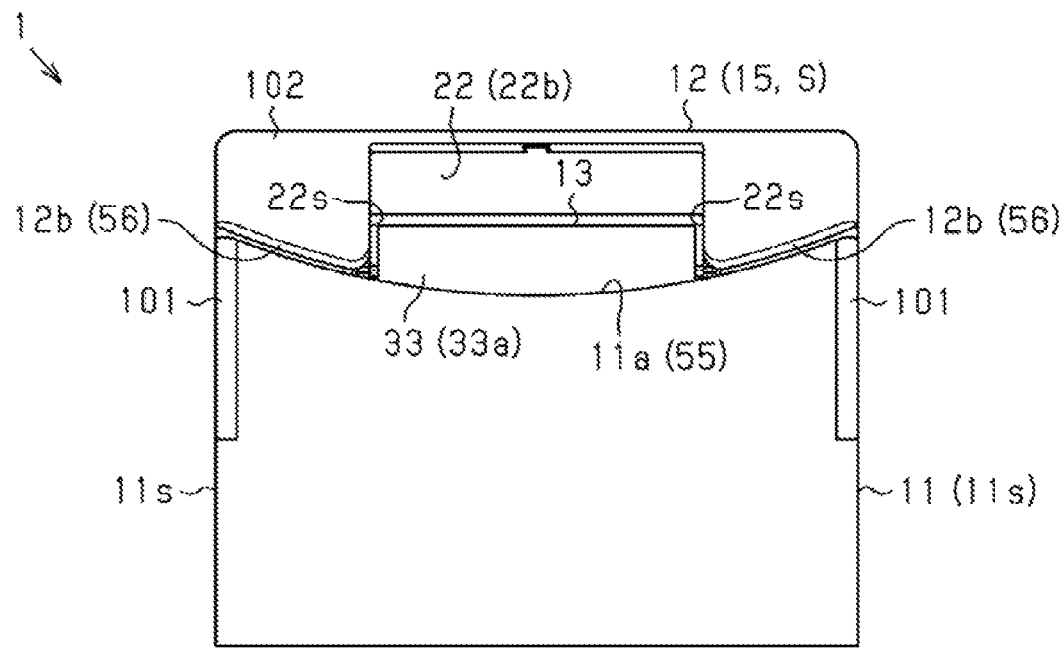
FIG. 1 is a side view of a support apparatus according to an embodiment disclosed here.
Figure 2:
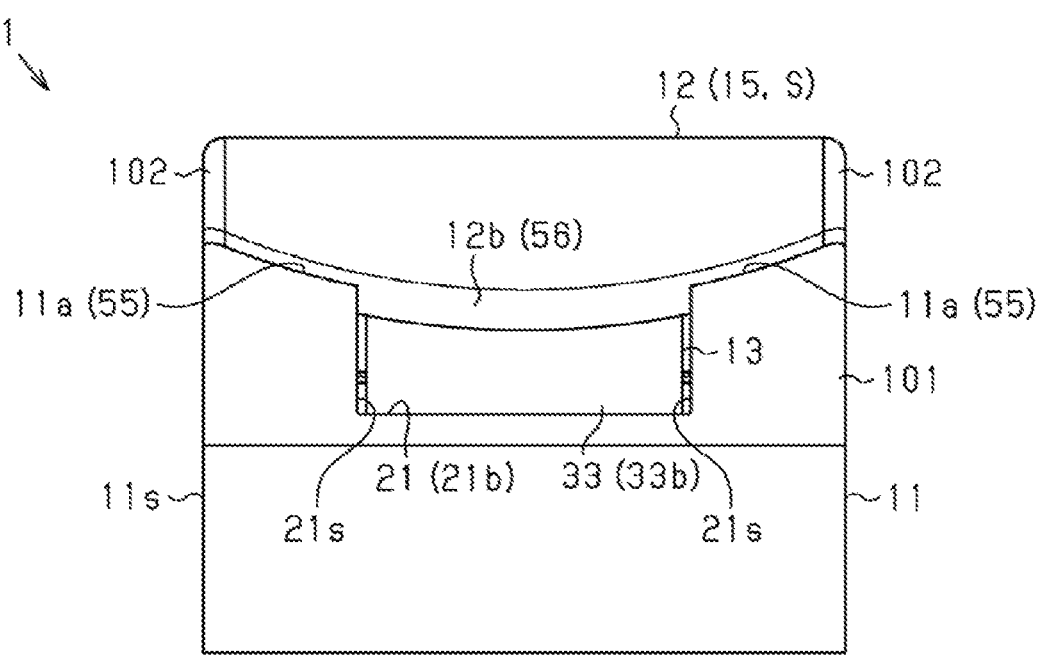
FIG. 2 is another side view of the support apparatus.
Figure 3:
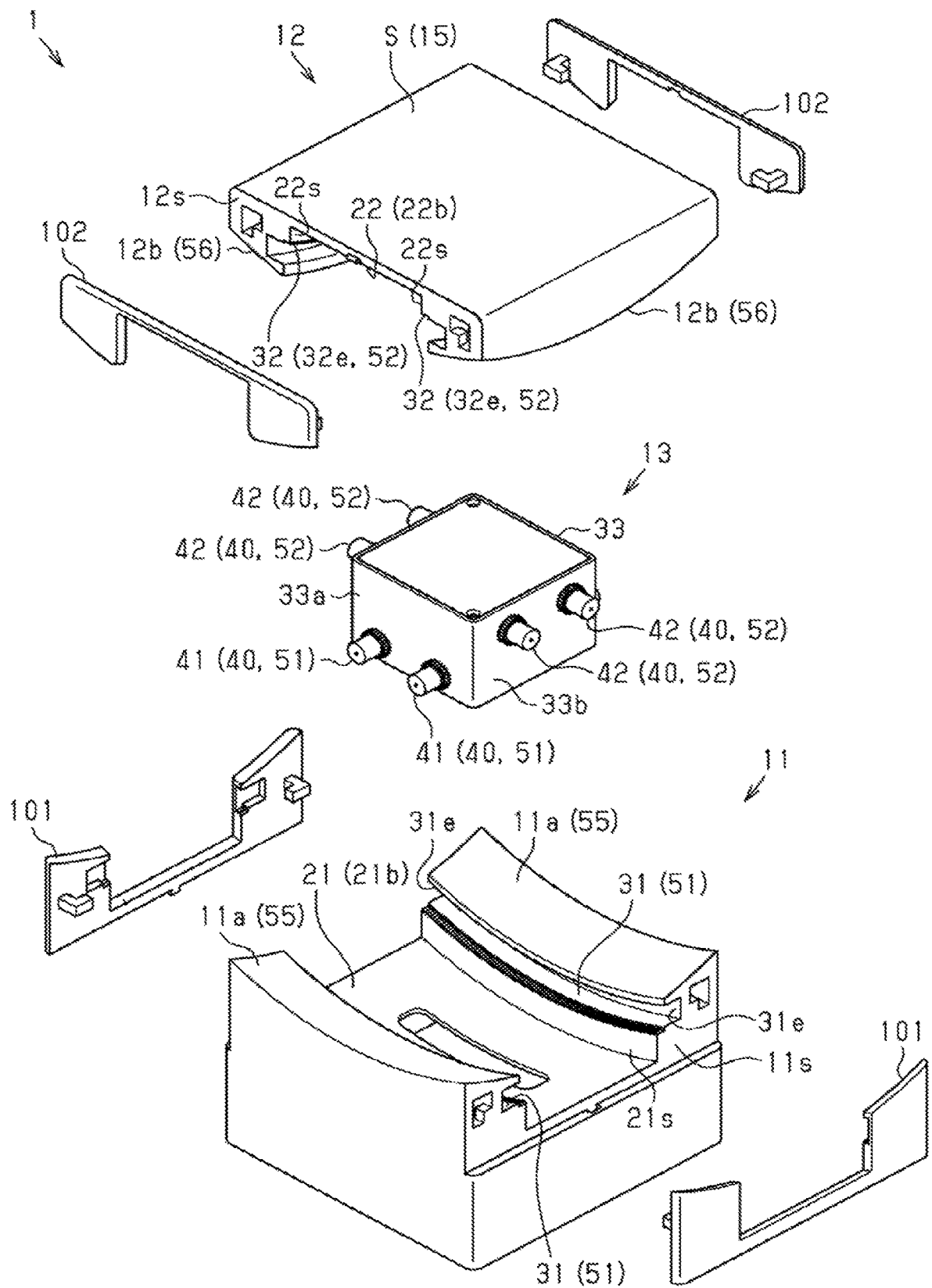
FIG. 3 is an exploded perspective view of the support apparatus.

As illustrated in FIGS. 1 to 3, a support apparatus 1 according to the embodiment includes a base member 11, an upper member 12 mounted at an upper side of the base member 11, and an intermediate member 13 disposed between the base member 11 and the upper member 12. The upper member 12 includes a flat surface 15 serving as a mounting surface S for an object that is supported at an upper side of the upper member 12. The upper member 12 is mounted at the base member 11 in a state where the flat surface 15 faces upward. The support apparatus 1 includes a substantially cubic form in a state where the base member 11, the upper member 12, and the intermediate member 13 are integrally assembled on one another.

Specifically, as illustrated in FIGS. 4 to 7, the base member 11 includes a first recess portion 21 that opens at an upper surface 11a. The first recess portion 21 of the base member 11 is a recess (groove) extending in a first direction that corresponds to an up and down direction in FIG. 5 and a right and left direction in FIG. 7. The support apparatus 1 is constructed in a manner that the intermediate member 13 is housed within the first recess portion 21, specifically, a substantially lower half of the intermediate member 13 is housed within the first recess portion 21.

As illustrated in FIGS. 8 to 11, the upper member 12 includes a second recess portion 22 that opens at a lower surface 12b serving as a backward surface relative to the flat surface 15a. The second recess portion 22 of the upper member 12 is a recess (groove) extending in a second direction that corresponds to a right and left direction in FIGS. 8 and 10. The second direction is orthogonal to the first direction in which the first recess portion 21 extends (see FIGS. 1 to 3). The support apparatus 1 is constructed in a manner that the intermediate member 13 and the upper member 12 are mounted in the mentioned order at the upper surface 11a of the base member 11 in a state where the intermediate member 13 is housed within the second recess portion 22, specifically, a substantially upper half of the intermediate member 13 is housed within the second recess portion 22.

As illustrated in FIGS. 4 to 7, the support apparatus 1 includes a pair of first rails 31, 31 provided at the base member 11. The pair of first rails 31, 31 is arranged parallel to each other while sandwiching therebetween the intermediate member 13. Specifically, the first rails 31, 31 are formed at respective wall surfaces 21s, 21s of the base member 11 along the extending direction of the first recess portion 21 in a groove form. The first rails 31, 31 extend in the first direction accordingly.

As illustrated in FIGS. 8 to 11, the support apparatus 1 includes a pair of second rails 32, 32 provided at the upper member 12. The pair of second rails 32, 32 is arranged parallel to each other while sandwiching therebetween the intermediate member 13. Specifically, the second rails 32, 32 are formed at respective wall surfaces 22s, 22s of the upper member 12 along the extending direction of the second recess portion 22 in a groove form. The second rails 32, 32 extend in the second direction accordingly.

As illustrated in FIGS. 4, 5, 10 to 13, the intermediate member 13 includes a flat case 33 in a substantially box form including dimensions smaller than a groove width of the first recess portion 21 provided at the base member 11 and smaller than a groove width of the second recess portion 22 provided at the upper member 12. The intermediate member 13 also includes plural rotation members 40 pivotally and rotatably supported in a state where the rotation members 40 protrude from the case 33 in a substantially horizontal direction. The rotation members 40 function as pairs of first rollers 41, 41 each pair engaging with the pair of first rails 31, 31 provided at the base member 11 and function as pairs of second rollers 42, 42 each pair engaging with the pair of second rails 32, 32 provided at the upper member 12.

The pairs of first rollers 41, 41 provided at the intermediate member 13 engage, from an upper side thereof, with the pair of first rails 31, 31 provided at the base member 11 so that the intermediate member 13 is supported at the upper side of the base member 11. The base member 11 and the intermediate member 13 are allowed to move relative to each other in the first direction while conforming to the groove form of the first recess portion 21 at which the intermediate member 13 is housed. Each pair of first rollers 41, 41 rolls on the pair of first rails 31, 31, which changes the position of the intermediate member 13 relative to the base member 11 in the first direction where the first rails 31, 31 extend.

The pair of second rails 32, 32 provided at the upper member 12 engage, from an upper side thereof, with the pairs of second rollers 42, 42 provided at the intermediate member 13 so that the upper member 12 is supported at the upper side of the intermediate member 13. The upper member 12 and the intermediate member 13 are allowed to move relative to each other in the second direction while conforming to the groove form of the second recess portion 22 at which the intermediate member 13 is housed. Each pair of second rollers 42, 42 seemingly or apparently rolls on the pair of second rails 32, 32, which changes the position of the upper member 12 at which the intermediate member 13 is supported, relative to the base member 11 in the second direction where the second rails 32, 32 extend.

As illustrated in FIGS. 4, 7, 8, and 11, each of the first and second rails 31 and 32 is a curving rail in a substantially arc form with longitudinal opposed ends bending upward. The intermediate member 13 including the pairs of first rollers 41, 41 that engage with the pair of first rails 31, 31 and the pairs of second rollers 42, 42 that engage with the pair of second rails 32, 32 constitutes a first pendulum mechanism 51 allowing an oscillation (i.e., a swingable movement) of the upper member 12 in the first direction and a second pendulum mechanism 52 allowing an oscillation (swingable movement) of the upper member 12 in the second direction.

Figure 14:
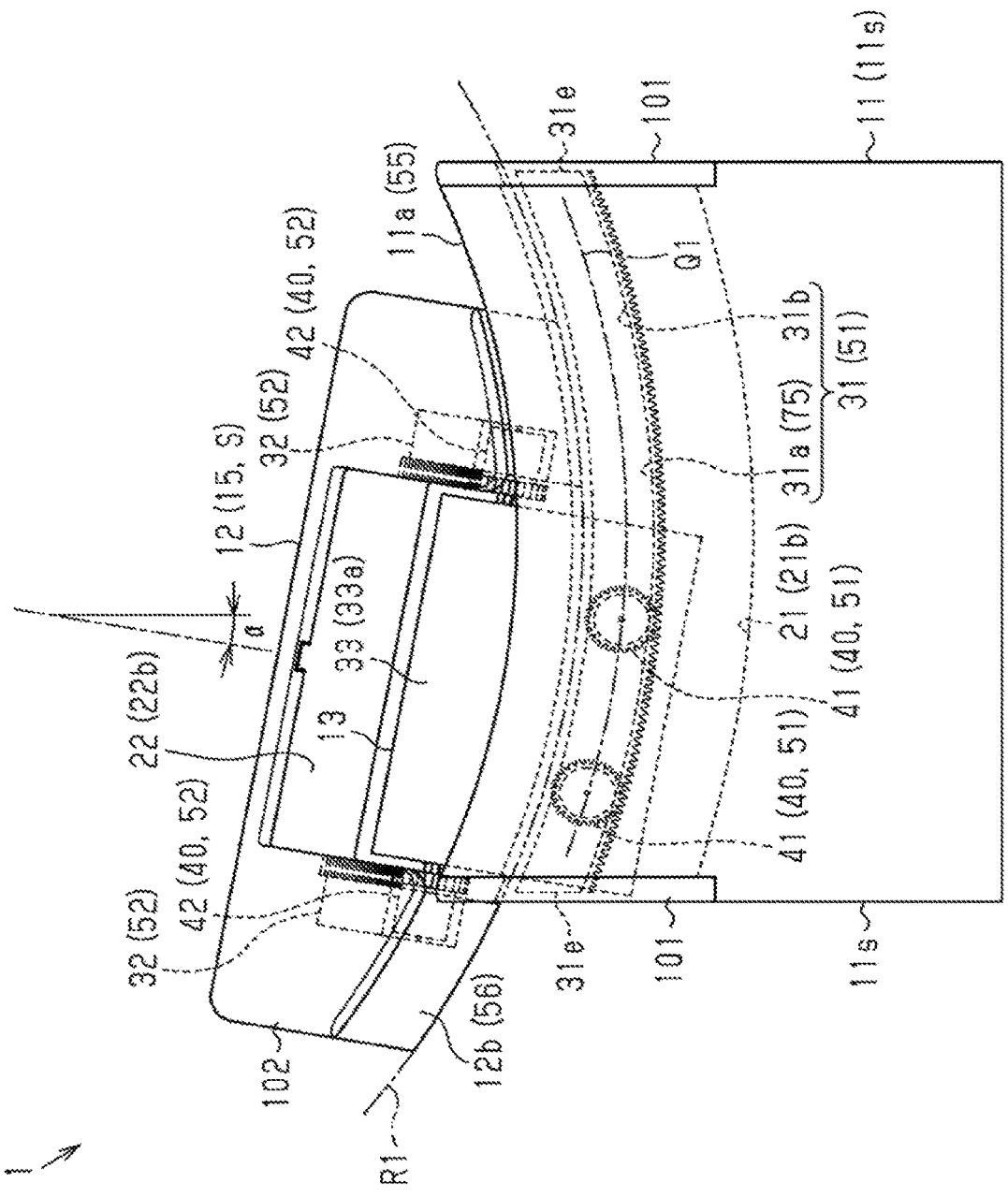
FIG. 14 is a diagram explaining an operation of the support apparatus.

As illustrated in FIG. 14, each pair of first rollers 41, 41 forms a locus Q1 in an arc shape when rolling on the pair of first rails 31, 31. The intermediate member 13 and the upper member 12 supported at the upper side of the base member 11 via the first rails 31, 31 and the first rollers 41, 41 also swingably move in the first direction and form a moving locus R1 in an arc shape. Specifically, a center of the arc formed by the pair of first rails 31, 31 serves as an oscillation support point of the intermediate member 13 and the upper member 12 swingably moving in the first direction (i.e., a right and left direction in FIG. 14). The upper member 12 swingably moves, i.e., autonomously oscillates, in a direction where an inertia force acts when acceleration is generated in the first direction.

Figure 15:
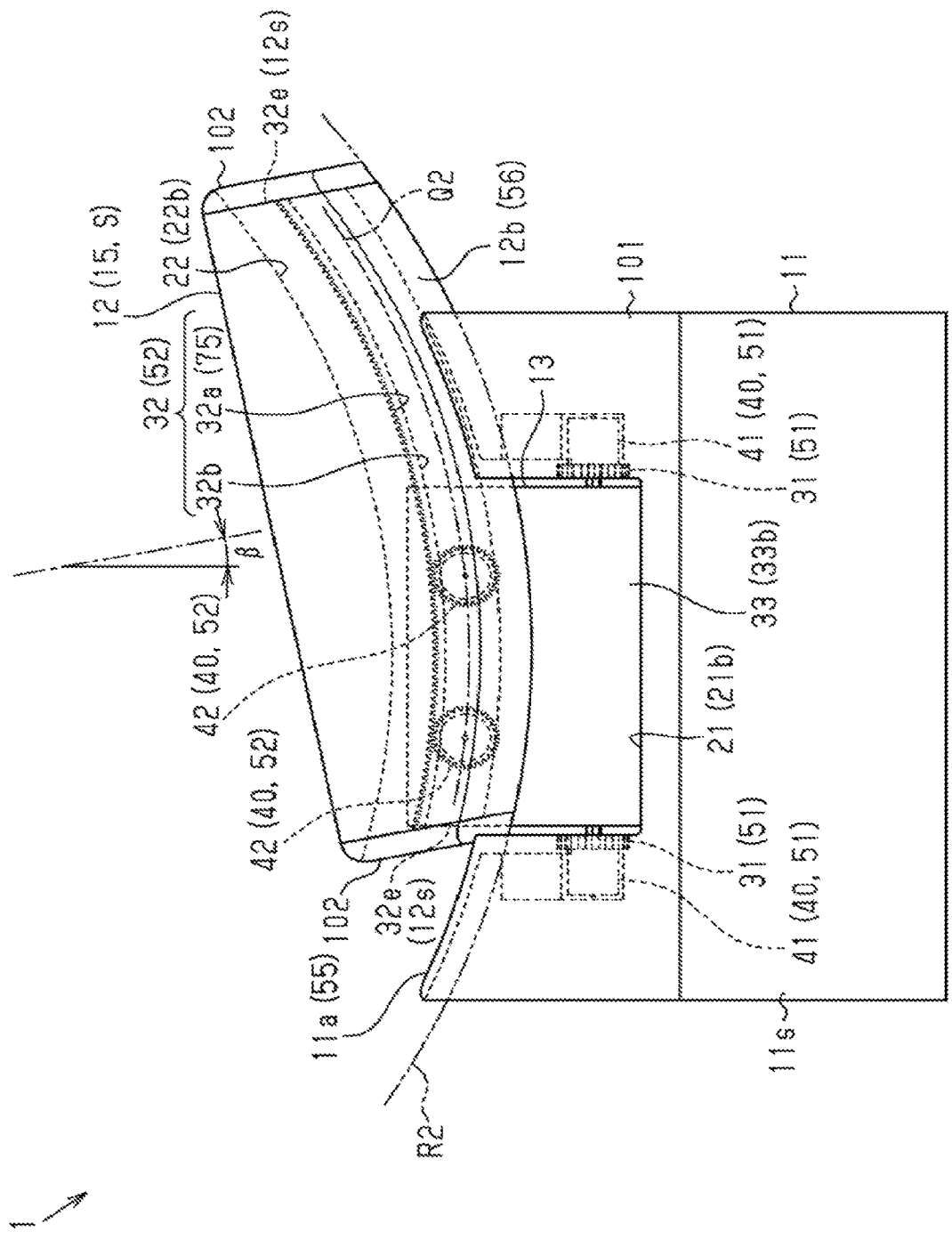
FIG. 15 is another diagram explaining the operation of the support apparatus.
Figure 16:
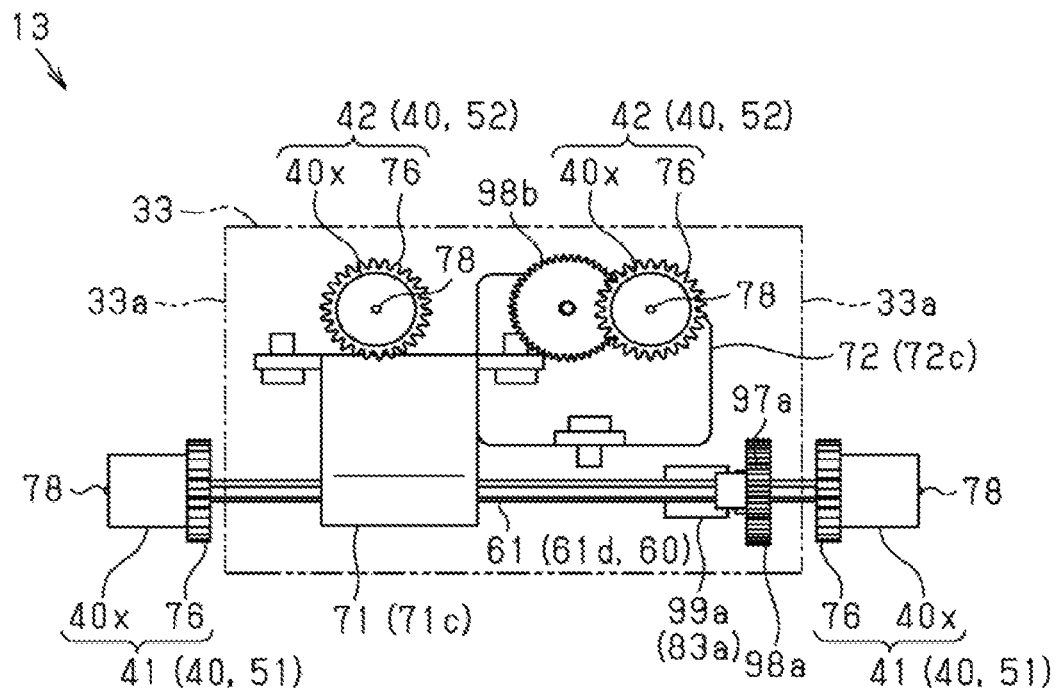
FIG. 16 is a side view of an internal structure of the intermediate member.
Figure 17:
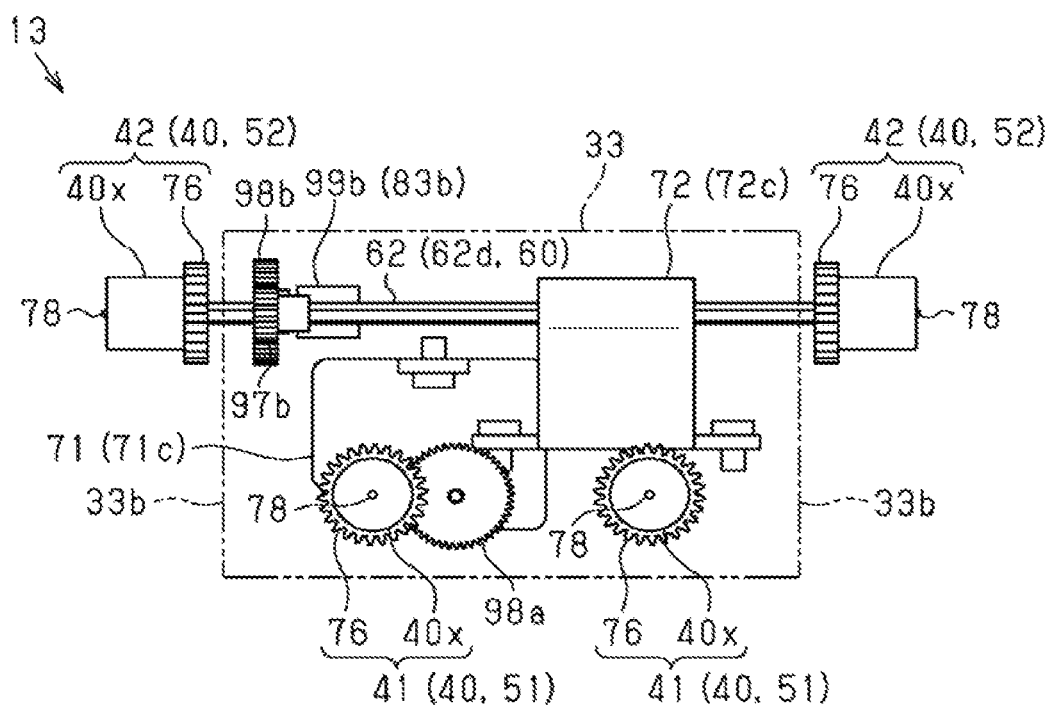
FIG. 17 is another side view of the internal structure of the intermediate member.
Figure 18:
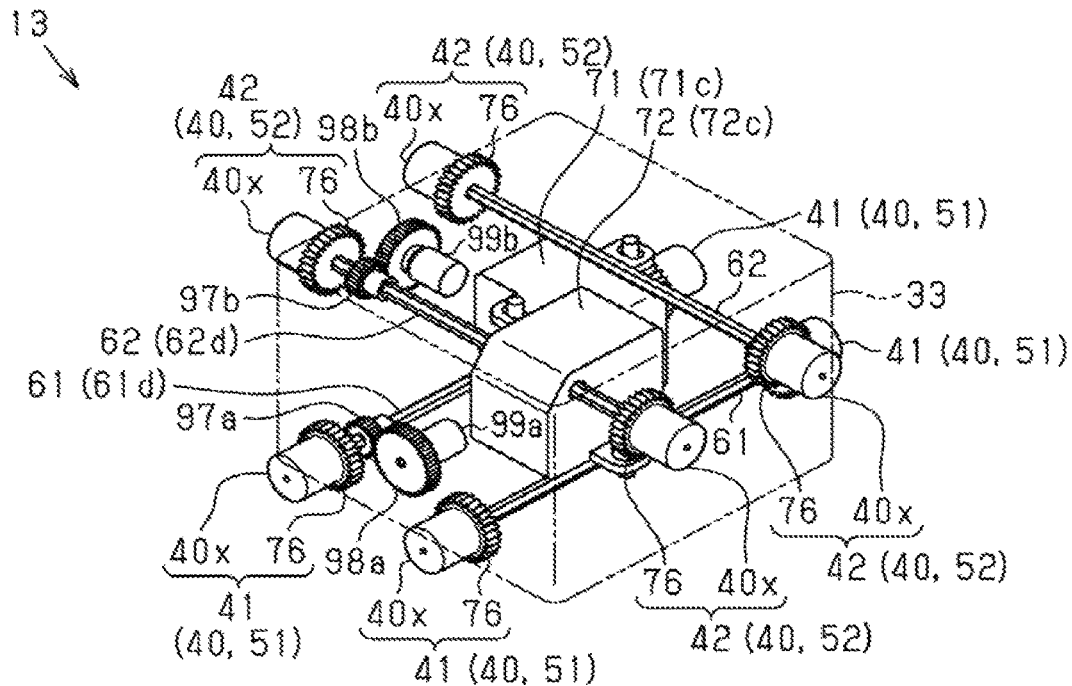
FIG. 18 is a perspective view of the internal structure of the intermediate member.
Figure 19:
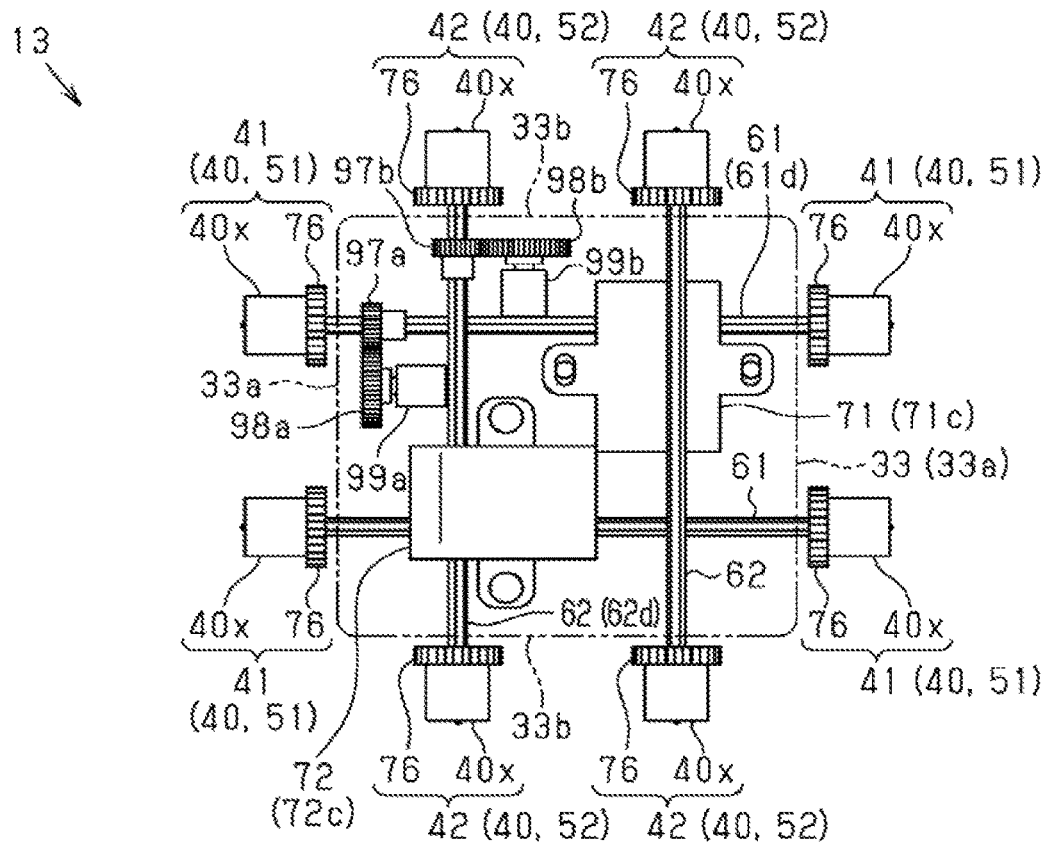
FIG. 19 is a plan view of the internal structure of the intermediate member.
Figure 20:
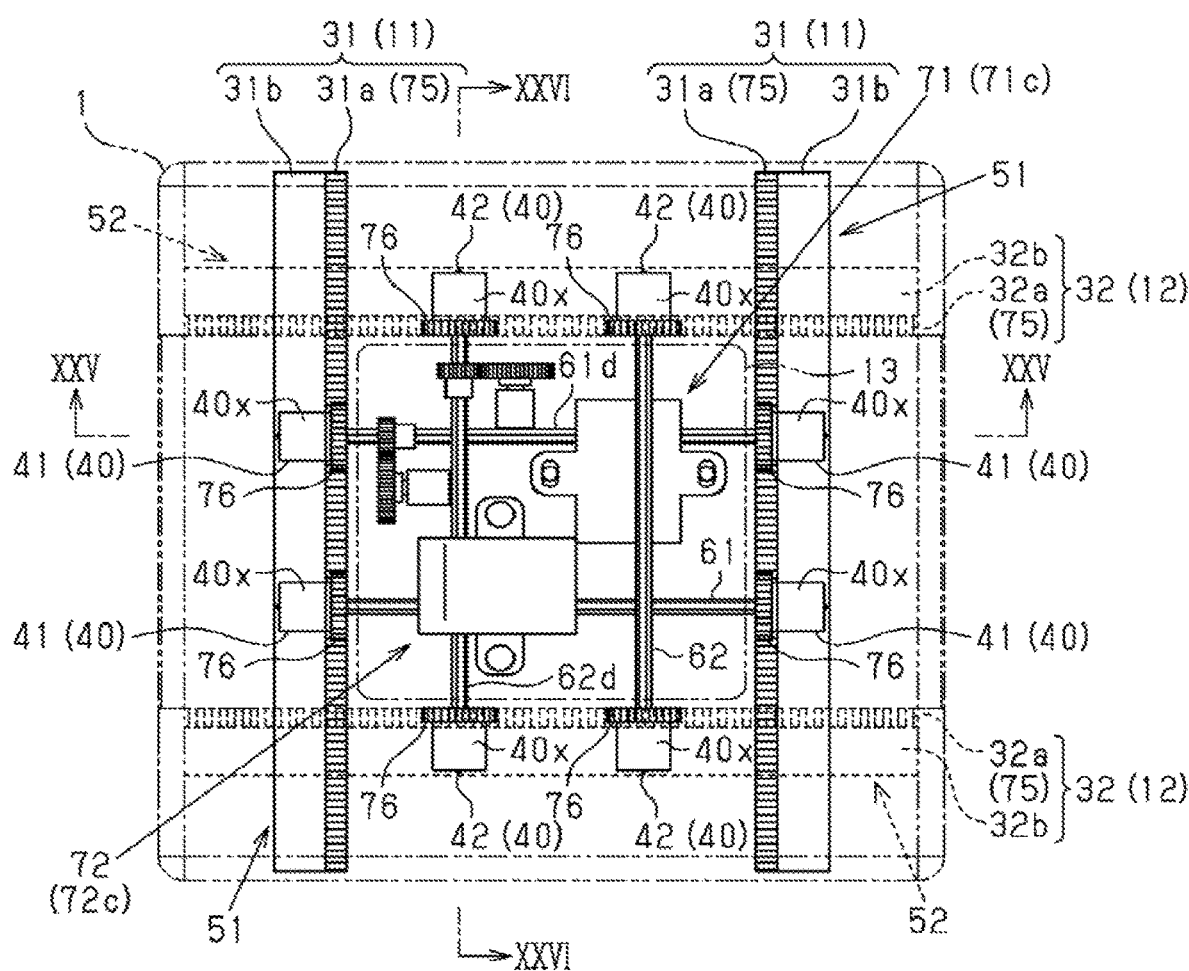
FIG. 20 is a plan view of a first pendulum mechanism and a second pendulum mechanism.
Figure 21:
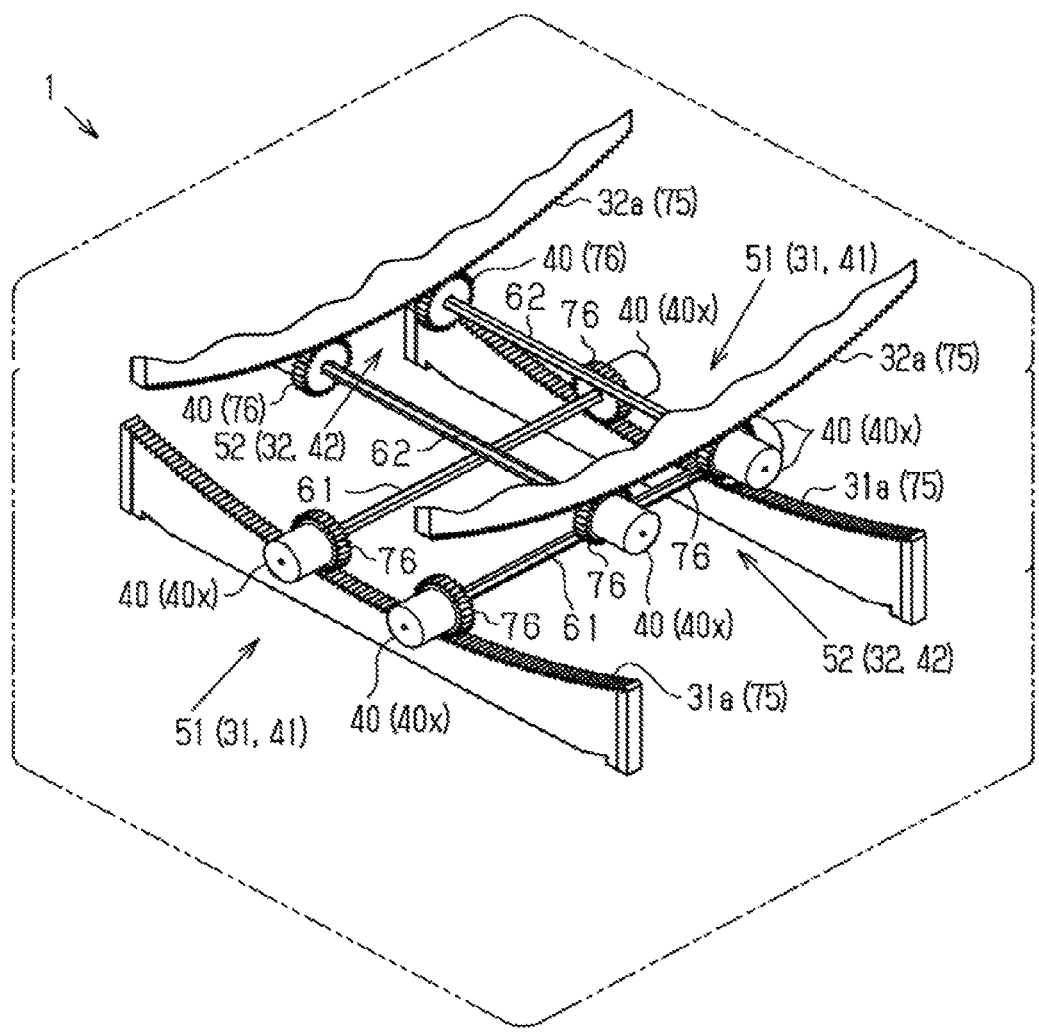
FIG. 21 is a perspective view of the first pendulum mechanism and the second pendulum mechanism.

As illustrated in FIG. 15, each pair of second rollers 42, 42 forms a locus Q2 in an arc shape when apparently rolling on the pair of second rails 32, 32. The upper member 12 supported at the upper side of the intermediate member 13 via the second rails 32, 32 and the second rollers 42, 42 also swingably move in the second direction and form a moving locus R2 in an arc shape. Specifically, a center of the arc formed by the pair of second rails 32, 32 serves as an oscillation support point of the upper member 12 swingably moving in the second direction (i.e., a right and left direction in FIG. 15). The upper member 12 swingably moves, i.e., autonomously oscillates, in a direction where an inertia force acts when acceleration is generated in the second direction.

According to the support apparatus 1, the upper member 12 is allowed to autonomously oscillate (swingably move) in any direction on a horizontal plane including the first direction and the second direction by the operations of the first pendulum mechanism 51 and the second pendulum mechanism 52. A direction where an inertia force acts is made closer to a direction orthogonal to the mounting surface S of the upper member 12, so that a position (posture) of an object supported above the mounting surface S may be stably maintained.

Figure 4:
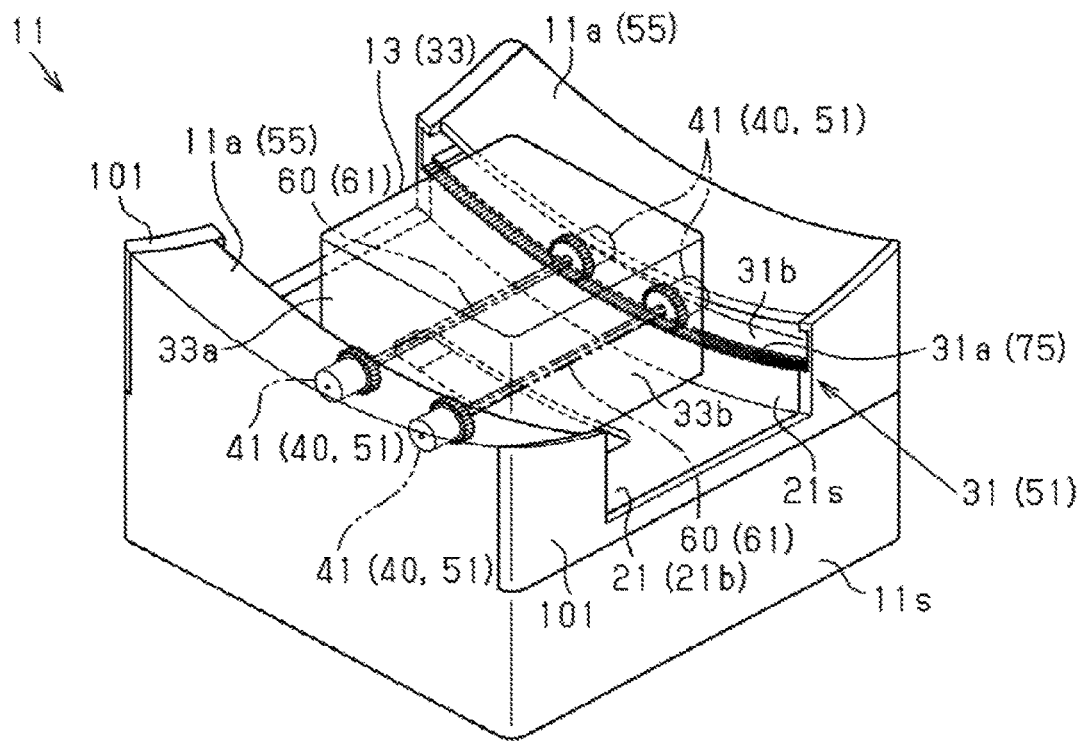
FIG. 4 is a perspective view of a base member.
Figure 5:
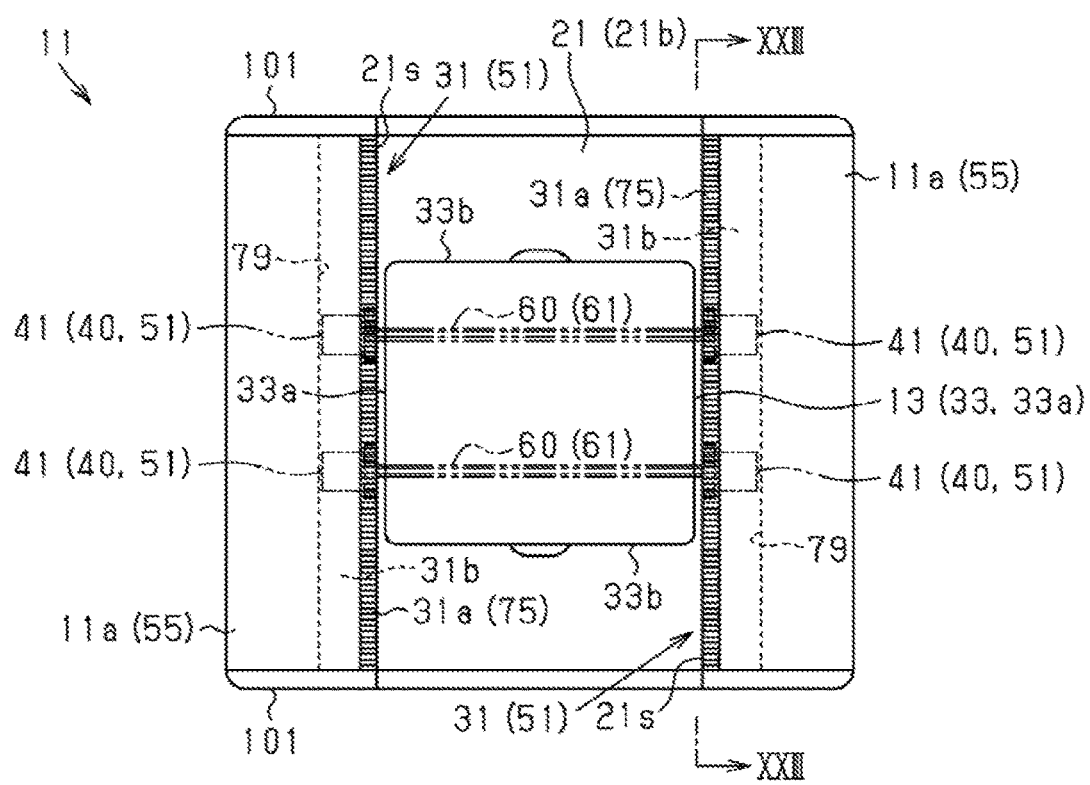
FIG. 5 is a plan view of the base member.
Figure 7:
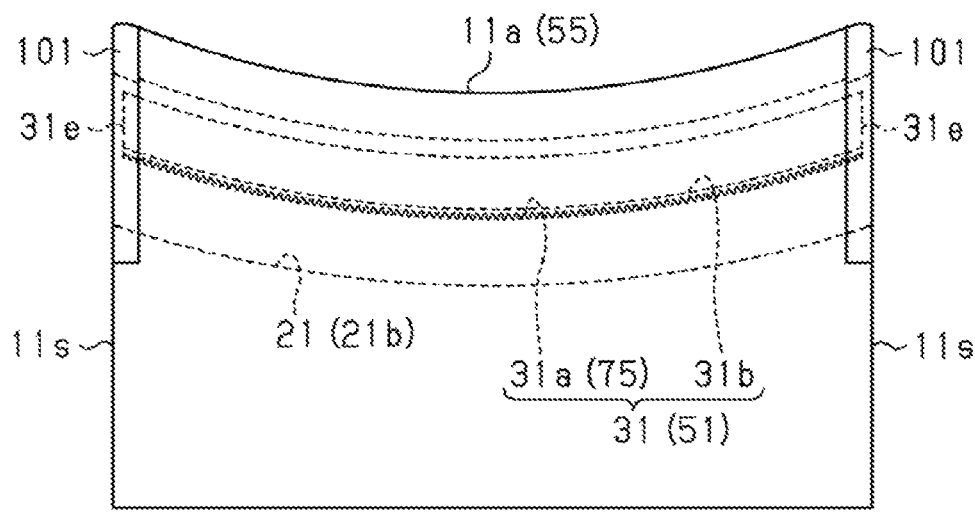
FIG. 7 is another side view of the base member.
Figure 8:
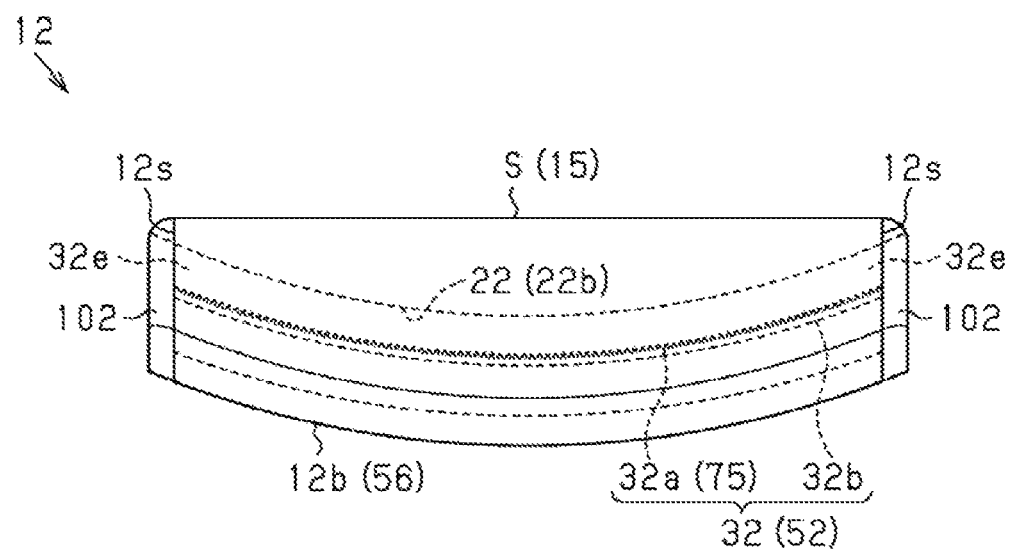
FIG. 8 is a side view of an upper member.
Figure 11:
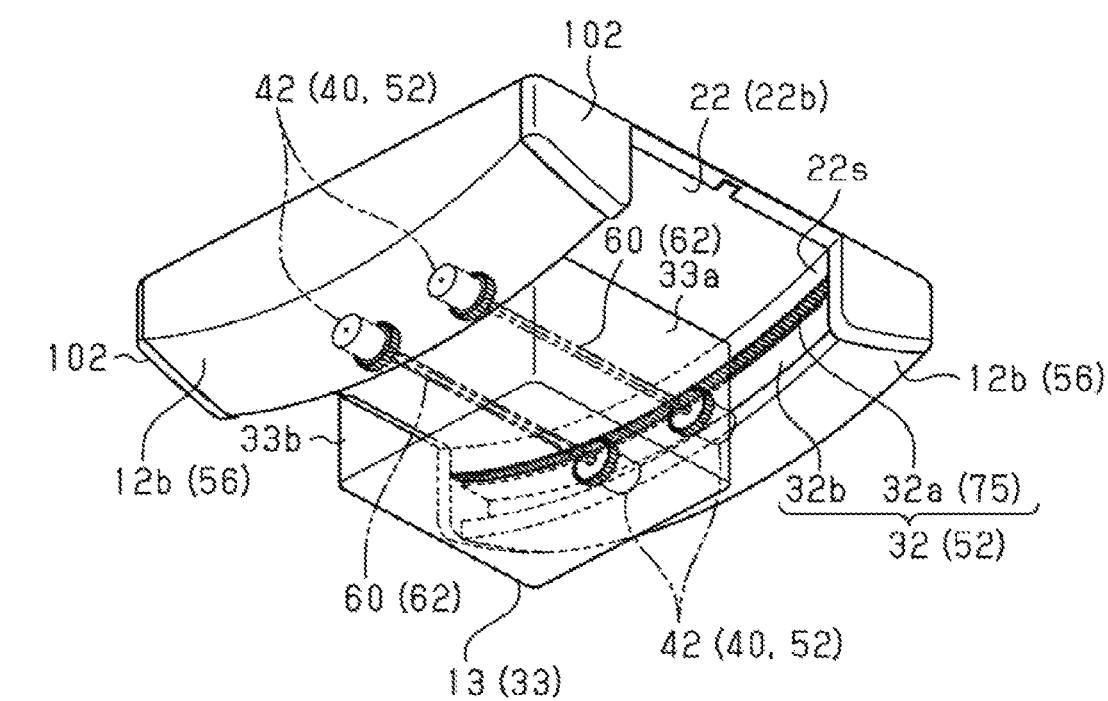
FIG. 11 is a perspective view of the upper member.

As illustrated in FIGS. 4 and 7, the first recess portion 21 provided at the base member 11 includes a bottom surface 21b forming a curving recess surface that extends along the pair of first rails 31, 31. Additionally, as illustrated in FIGS. 8 and 11, the second recess portion 22 provided at the upper member 12 includes a bottom surface 22b forming a curving protrusion surface that extends along the pair of second rails 32, 32. The support apparatus 1 is constructed so that the intermediate member 13 is inhibited from making contact with the base member 11 or the upper member 12 when the intermediate member 13 supported above the base member 11 oscillates in the first direction and when the upper member 12 supported above the intermediate member 13 oscillates in the second direction.

Figure 6:
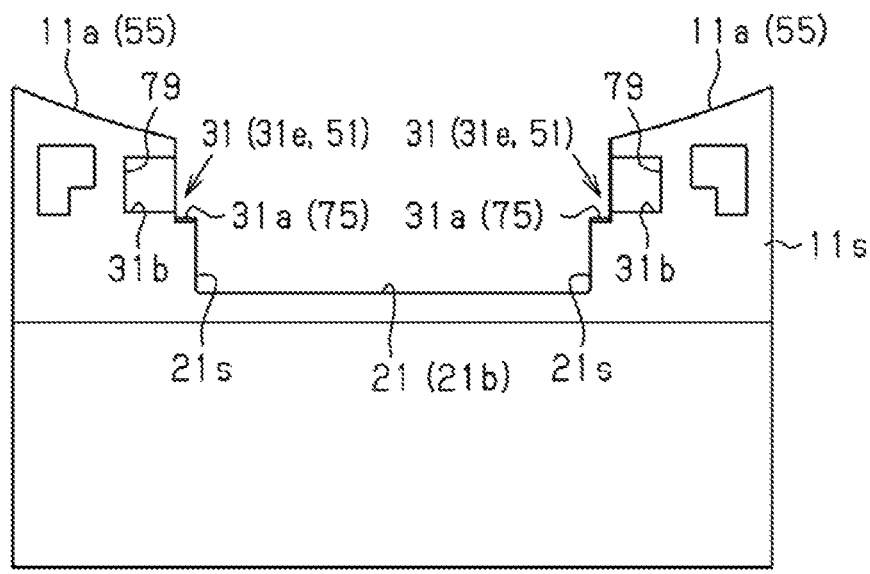
FIG. 6 is a side view of the base member.

As illustrated in FIGS. 4, 6, and 7, the upper surface 11a where the first recess portion 21 opens in the base member 11 constitutes a curving recess surface 55 that curves in the first direction along the first rails 31, 31 provided at the base member 11 and curves in the second direction along the second rails 32, 32 provided at the upper member 12.

Figure 9:
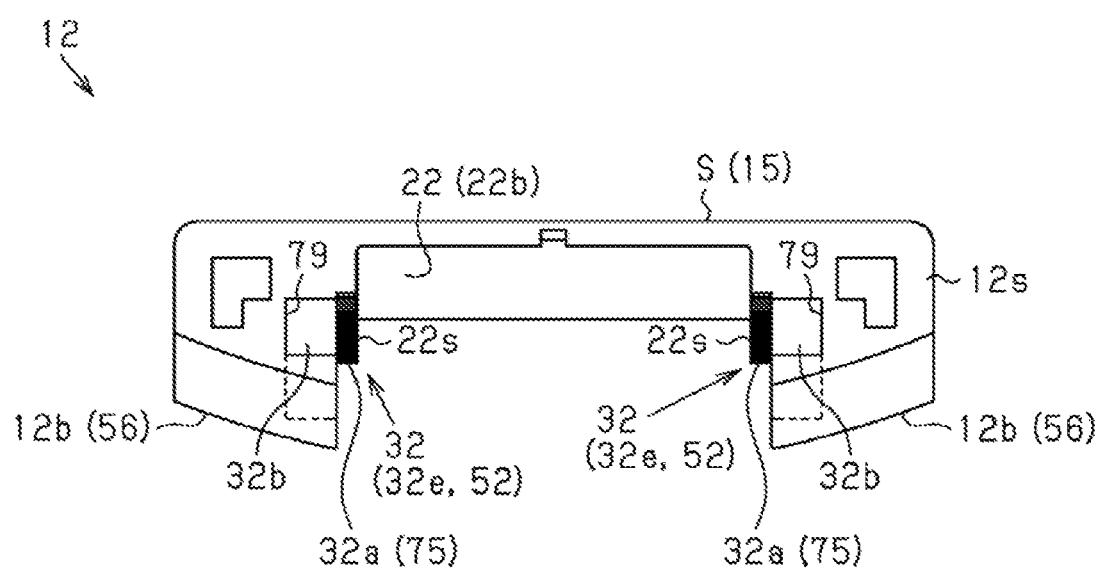
FIG. 9 is another side view of the upper member.
Figure 10:
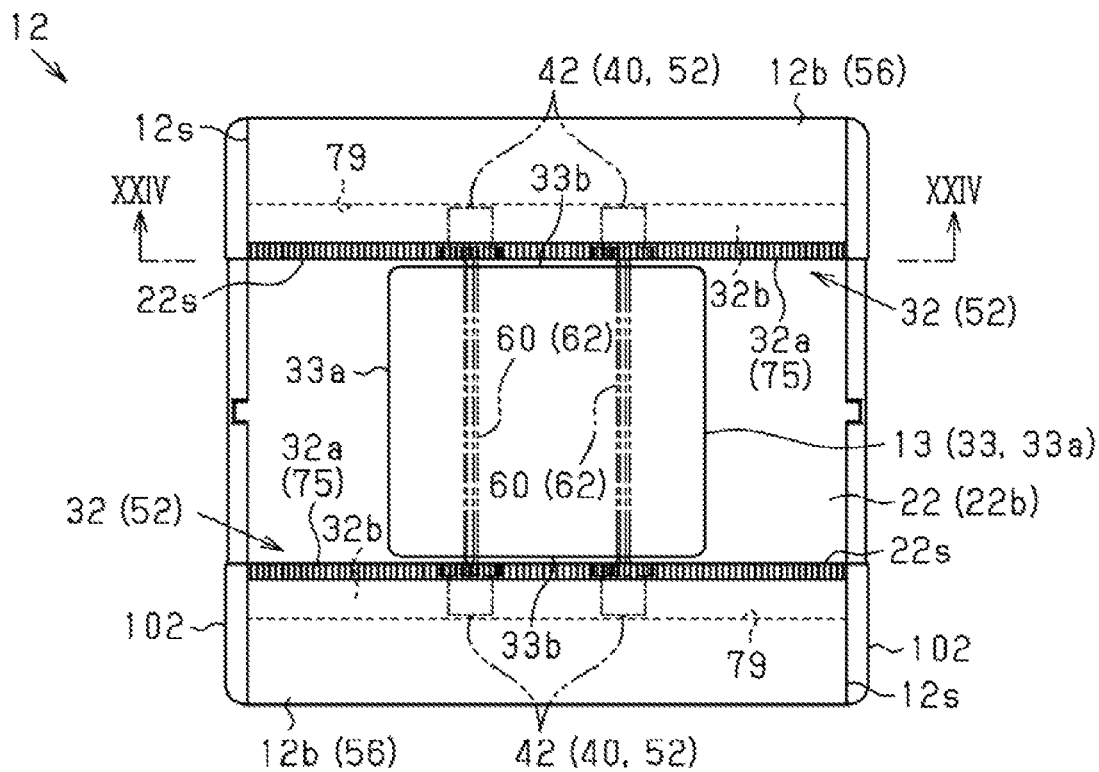
FIG. 10 is a bottom view of the upper member.

As illustrated in FIGS. 8, 9, and 11, the lower surface 12b where the second recess portion 22 opens in the upper member 12 constitutes a curving protrusion surface 56 that curves in the second direction along the second rails 32, 32 provided at the upper member 12 and curves in the first direction along the first rails 31, 31 provided at the base member 11.

As illustrated in FIGS. 1 and 2, the upper surface 11a of the base member 11 and the lower surface 12b of the upper member 12 face each other in an up and down direction and include substantially the same curving forms. The upper member 12 oscillates in any direction on the horizontal plane including the first direction and the second direction in a state where the curving recess surface 55 provided at the base member 11 and the curving protrusion surface 56 provided at the upper member 12 keeps a predetermined clearance therebetween as illustrated in FIGS. 14 and 15. Dimensions of the support apparatus 1 in the up and down direction decrease with a reduced clearance between the base member 11 and the upper member 12 without a contact between the base member 11 and the upper member 12 accordingly.

As illustrated in FIGS. 16 to 19, the intermediate member 13 includes plural support shafts 60 penetrating through the case 33 in the substantially horizontal direction. Each support shaft 60 includes opposed ends at which the pair of rotation members 40, 40 constituting the pair of first rollers 41, 41 or the pair of second rollers 42, 42 is mounted.

Specifically, as illustrated in FIGS. 5, 16 to 19, the intermediate member 13 includes a pair of first support shafts 61, 61 rotatably and pivotally supported at side surfaces 33a, 33a of the case 33 facing the pair of first rails 31, 31 provided at the base member 11. The first support shafts 61, 61 are arranged penetrating through the side surfaces 33a, 33a. The pair of rotation members 40, 40 constituting the pair of first rollers 41, 41 and fixed to the opposed ends of each first support shaft 61 engages with the pair of first rails 31, 31.

Additionally, as illustrated in FIGS. 10, 16 to 19, the intermediate member 13 includes a pair of second support shafts 62, 62 rotatably and pivotally supported at side surfaces 33b, 33b, of the case 33 facing the pair of second rails 32, 32 provided at the upper member 12. The second support shafts 62, 62 are arranged penetrating through the side surfaces 33b, 33b. The pair of rotation members 40, 40 constituting the pair of second rollers 42, 42 and fixed to the opposed ends of each second support shaft 62 engages with the pair of second rails 32, 32.

As illustrated in FIGS. 16 to 19, one of the pair of first support shafts 61, 61 serves as a drive shaft 61d. In the same manner, one of the pair of second support shafts 62, 62 serves as a drive shaft 62d. The intermediate member 13 includes a first drive portion 71 driving and rotating the pair of first rollers 41, 41 together with the drive shaft 61d, and a second drive portion 72 driving and rotating the pair of second rollers 42, 42 together with the drive shaft 62d.

The first drive portion 71 and the second drive portion 72 include respective cases 71c and 72c in a substantially box form, each of the cases 71c and 72c housing a motor serving as a drive source and a decelerator. The first drive portion 71 and the second drive portion 72 are housed within the case 33 of the intermediate member 13.

As illustrated in FIGS. 16 to 20, the first pendulum mechanism 51 including the pair of first rails 31, 31 and the pairs of first rollers 41, 41, and the second pendulum mechanism 52 including the pair of second rails 32, 32 and the pairs of second rollers 42, 42 are driven by operations of the first drive portion 71 and the second drive portion 72. The oscillation (swingable movement) of the upper member 12 is thus actively controllable with the aforementioned compact construction.

As illustrated in FIGS. 21 to 24, the pair of first rails 31, 31 includes engagement surfaces 31a facing upward and provided with rack teeth portions 75. Additionally, the pair of second rails 32, 32 includes engagement surfaces 32a facing downward and provided with rack teeth portions 75. The rotation members 40 constituting the pairs of first rollers 41, 41 and the pairs of second rollers 42, 42 are provided with gear portions 76 engaging with the aforementioned rack teeth portions 75 in a state where the rotation members 40 engage with the pair of first rails 31, 31 and the pair of second rails 32, 32.

Figure 12:
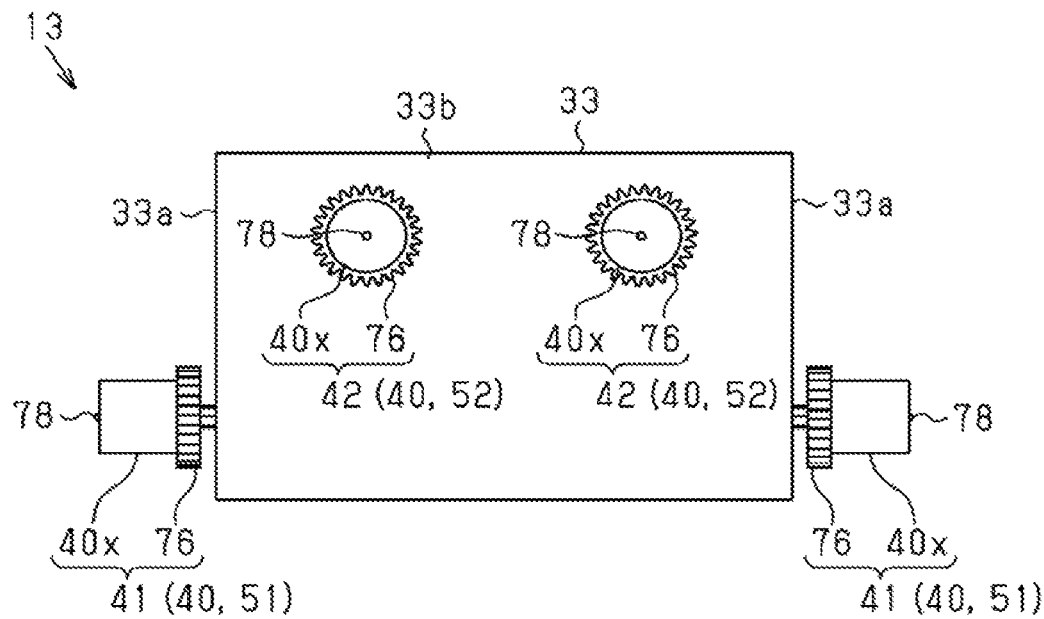
FIG. 12 is a side view of an intermediate member.
Figure 13:
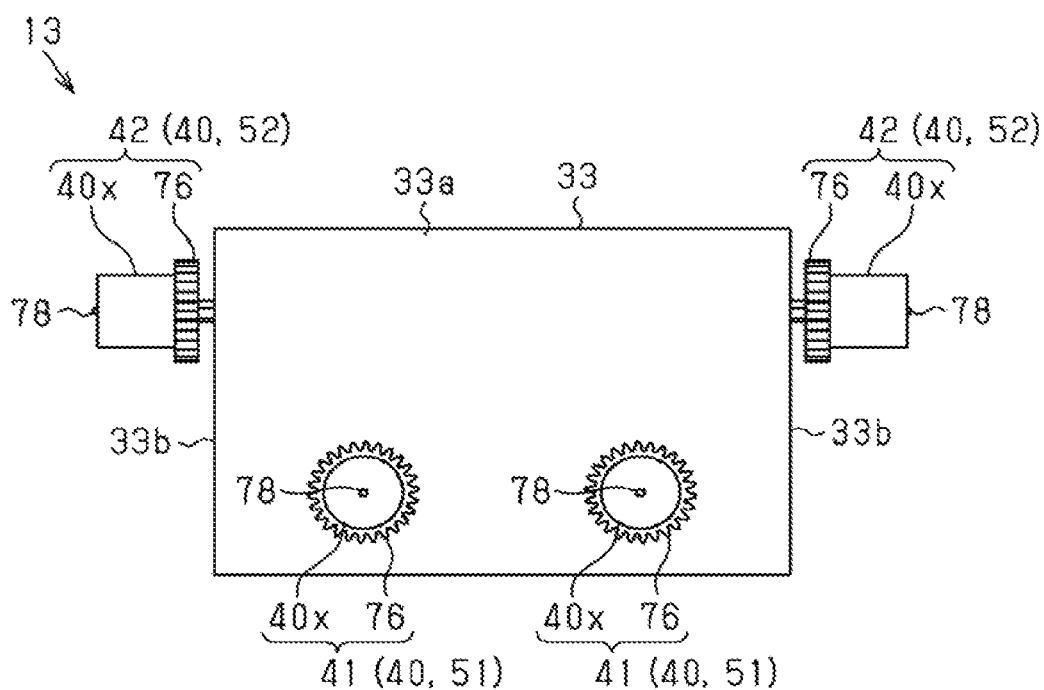
FIG. 13 is another side view of the intermediate member.
Figure 22:
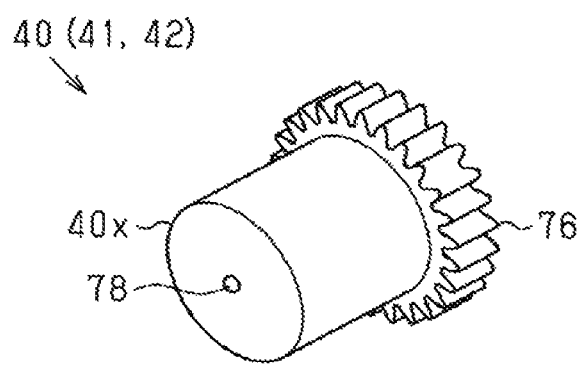
FIG. 22 is a perspective view of a rotation member.
Figure 23:
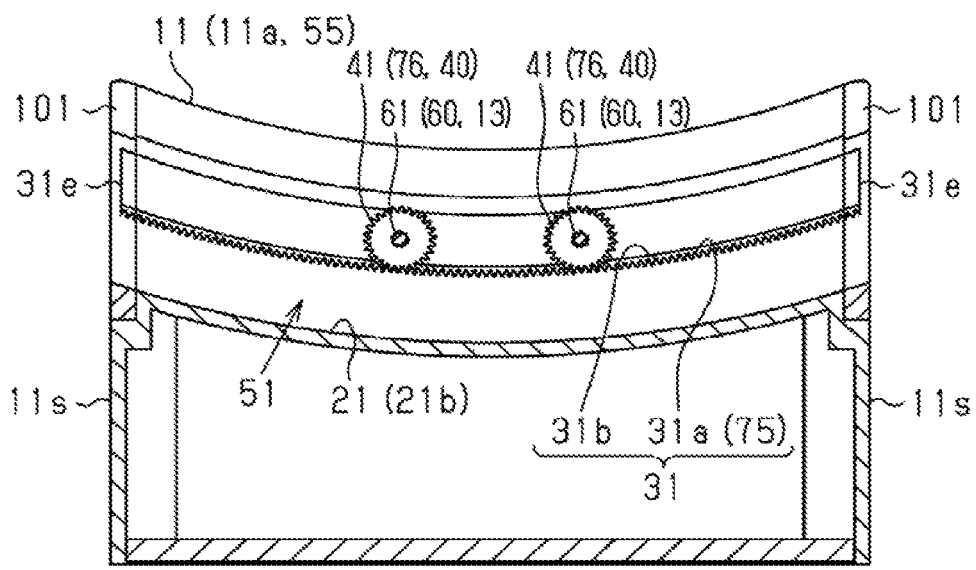
FIG. 23 is a cross-sectional view of the support apparatus.
Figure 24:
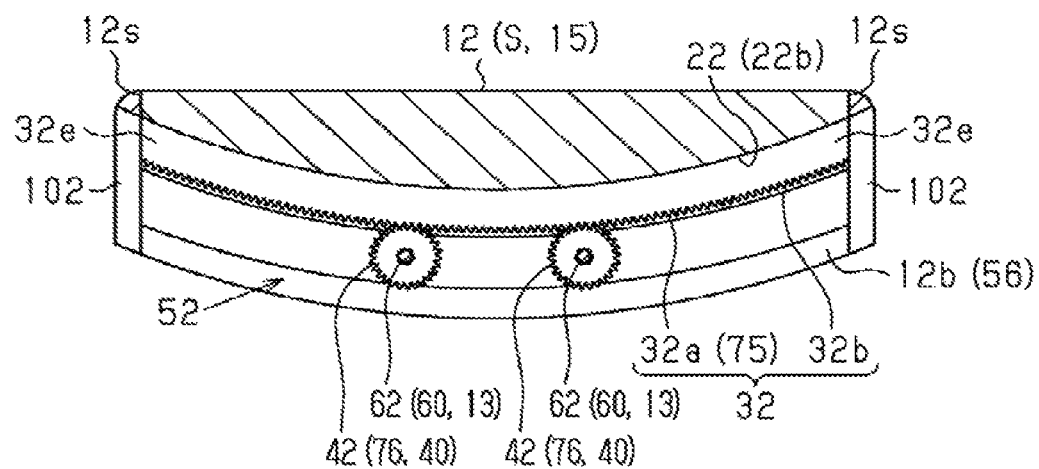
FIG. 24 is another cross-sectional view of the support apparatus.

As illustrated in FIGS. 12, 13, and 22, each of the rotation members 40 constituting the first and second rollers 41 and 42 includes a body portion 40x. Each gear portion 76 is provided at an axial base end of the body portion 40x to protrude radially outward in a flange manner.

As illustrated in FIGS. 4, 5, 23, and 25, each first rail 31 includes two-step engagement surfaces 31a and 31b provided in a stepped manner. The engagement surface 31a positioned closer to an opening side of each first rail 31 that opens at each wall surface 21s of the first recess portion 21 in a curving groove form is provided with the rack teeth portion 75. That is, the engagement surface 31a positioned forward as viewed from the inside of the first recess portion 21 where the case 33 of the intermediate member 13 is arranged is provided with the rack teeth portion 75. The gear portions 76 provided at each pair of first rollers 41, 41 engage with the rack teeth portions 75 at the respective engagement surfaces 31a positioned forward in the pair of first rails 31, 31. At the same time, the body portions 40x of each pair of first rollers 41, 41 slidably make contact with the engagement surfaces 31b positioned rearward in the pair of first rails 31, 31. The rotation members 40 constituting the pairs of first rollers 41, 41 engage with the pair of first rails 31, 31 accordingly.

As illustrated in FIGS. 10, 11, 24, and 26, each second rail 32 also includes two-step engagement surfaces 32a and 32b provided in a stepped manner. The engagement surface 32a positioned forward as viewed from the inside of the second recess portion 22 of the upper member 12 where the case 33 of the intermediate member 13 is arranged is provided with the rack teeth portion 75. The gear portions 76 provided at each pair of second rollers 42, 42 engage with the rack teeth portions 75 at the respective engagement surfaces 32a positioned forward in the pair of second rails 32, 32. At the same time, the body portions 40x of each pair of second rollers 42, 42 slidably make contact with the engagement surfaces 32b positioned rearward in the pair of second rails 32, 32. The rotation members 40 constituting the pairs of second rollers 42, 42 engage with the pair of second rails 32, 32 accordingly.

The gear portions 76 and the rack teeth portions 75 are meshed with each other to stably hold the engagement positions of the rotation members 40 constituting the pairs of first rollers 41, 41 and the pairs of second rollers 42, 42. Specifically, positional error or idling of the pairs of first rollers 41, 41 engaging with the pair of first rails 31, 31 and the pairs of second rollers 42, 42 engaging with the pair of second rails 32, 32 may be restrained. The position of the intermediate member 13 supported at the upper side of the base member 11 and the position of the upper member 12 are stably retained. Additionally, the first pendulum mechanism 51 and the second pendulum mechanism 52 are stably driven by the operations of the first drive portion 71 and the second drive portion 72.

Figure 25:
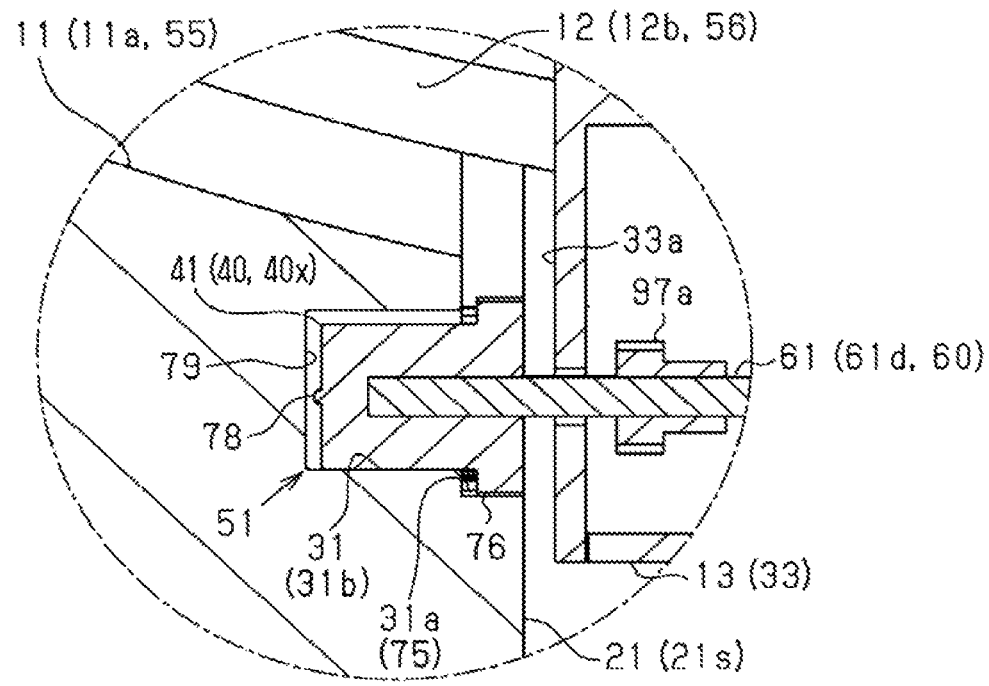
FIG. 25 is still another cross-sectional view of the support apparatus.
Figure 26:
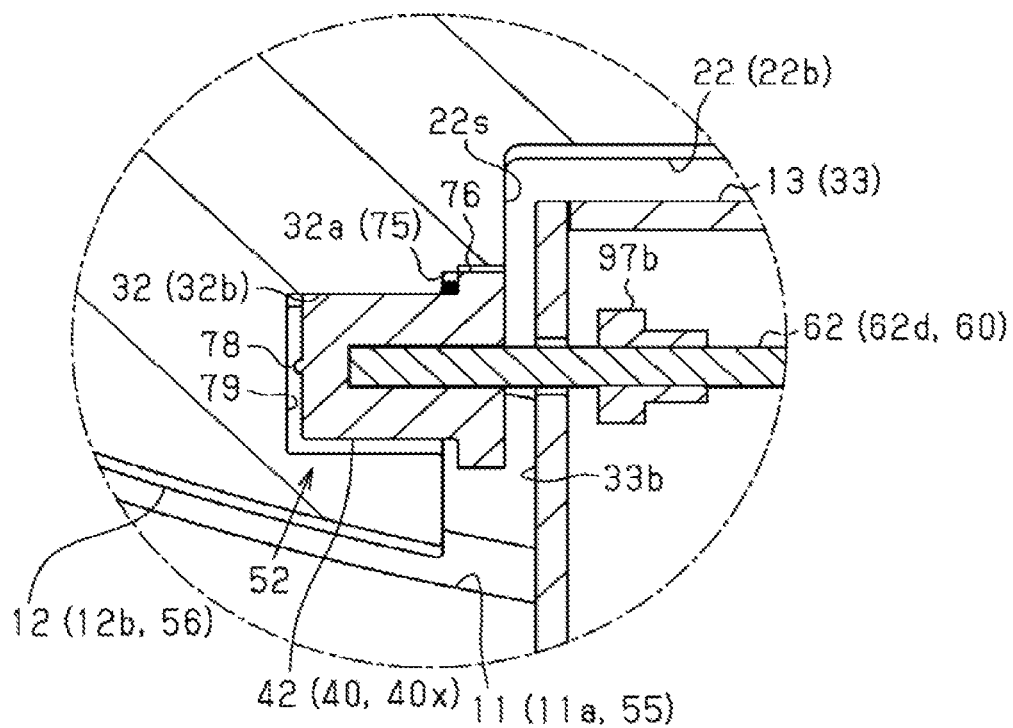
FIG. 26 is still another cross-sectional view of the support apparatus.

As illustrated in FIGS. 22, 25, and 26, the rotation members 40 respectively include protruding portions 78, each protruding portion 78 being provided at a rotation center thereof, i.e., at a position coaxial with the corresponding support shaft 60 at which the rotation member 40 is mounted. The protruding portions 78 axially protrude from the respective body portions 40x. In a case where each pair of first rollers 41, 41 engaging with the pair of first rails 31, 31 and each pair of second rollers 42, 42 engaging with the pair of second rails 32, 32 are axially displaced, the protruding portions 78 make slidable contact with wall surfaces 79 axially opposed to the protruding portions 78. The support apparatus 1 is constructed so that the first pendulum mechanism 51 and the second pendulum mechanism 52 securely smoothly operate while sliding resistance is restrained from increasing.

Next, the oscillation (swingable movement) control of the support apparatus 1 is explained. As illustrated in FIG. 27, the support apparatus 1 includes a controller 80 controlling operations of the first drive portion 71 and the second drive portion 72 provided at the intermediate member 13. The first drive portion 71 includes a motor 81a and a decelerator 82a that reduces rotations of the motor 81a to transmit the resulting rotations to the drive shaft 61d at opposed ends of which the pair of first rollers 41, 41 is mounted. In the same manner, the second drive portion 72 includes a motor 81b and a decelerator 82b that reduces rotations of the motor 81b to transmit the resulting rotations to the drive shaft 62d at opposed ends of which the pair of second rollers 42, 42 is mounted. The controller 80 controls the first drive portion 71 and the second drive portion 72 by supplying a driving electric power to the motors 81a and 81b each serving as a drive source.

The controller 80 detects inclination angles $\alpha$ and $\beta$ of the upper member 12 (see FIGS. 14 and 15) based on output signals of inclination angle sensors 83a and 83b. Specifically, the controller 80 detects the inclination angles $\alpha$ and $\beta$ generated in the first direction and the second direction at the upper member 12 by the operations of the first pendulum mechanism 51 and the second pendulum mechanism 52. The controller 80 also detects accelerations G1 and G2 in the first direction and the second direction generated at the support apparatus 1 based on output signals of acceleration sensors 84a and 84b. The controller 80 controls the oscillation of the upper member 12 based on the operations of the first drive portion 71 and the second drive portion 72, i.e., the operations of the first pendulum mechanism 51 and the second pendulum mechanism 52. The inclination angles $\alpha$ and $\beta$ of the upper member 12 in the first direction and the second direction are thus optimized depending on the accelerations G1 and G2 in the first direction and the second direction generated at the support apparatus 1.

Figure 28:
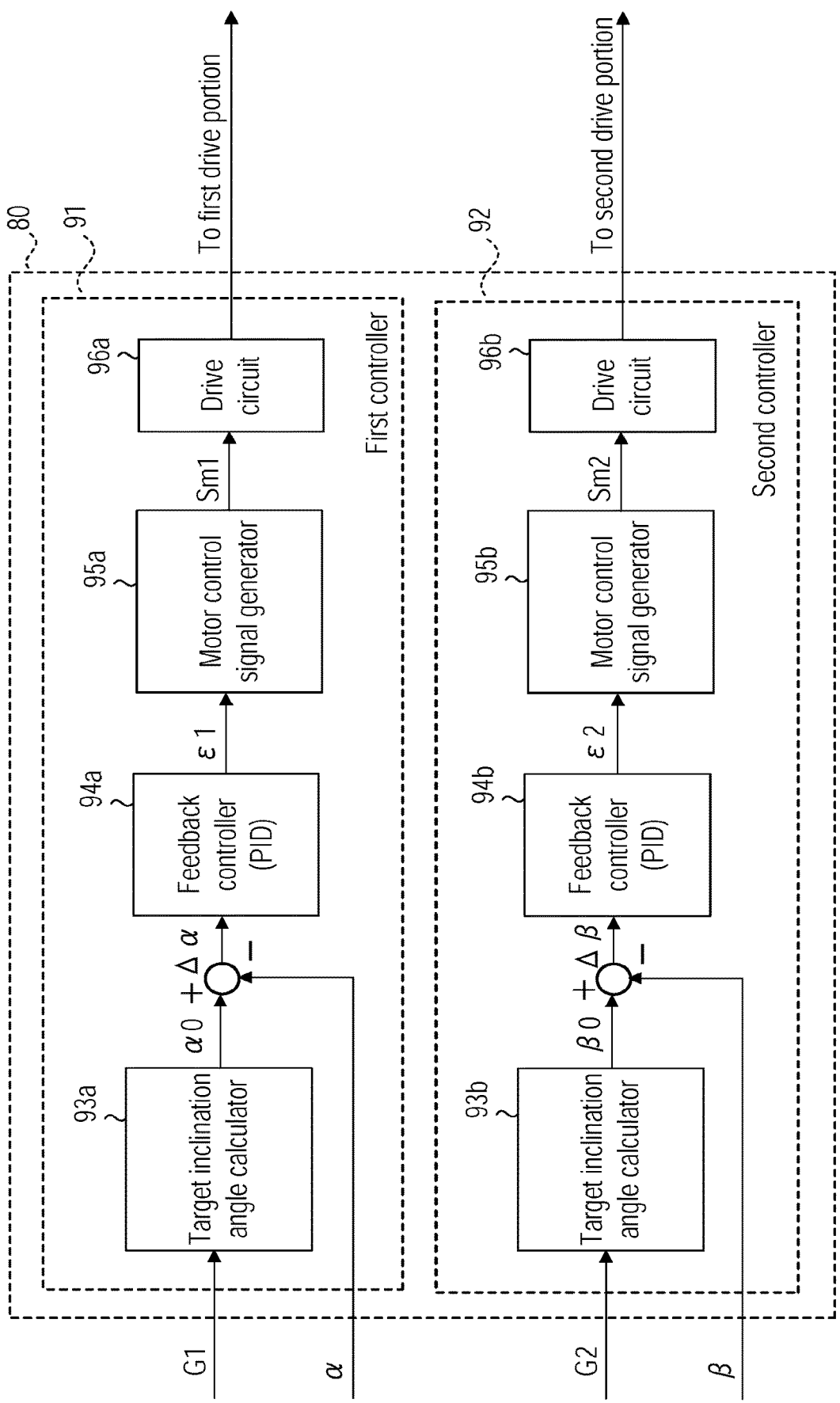
FIG. 28 is a control block diagram of the support apparatus.

As illustrated in FIG. 28, the controller 80 includes a first controller 91 controlling the operation of the first drive portion 71 and a second controller 92 controlling the operation of the second drive portion 72.

The first controller 91 includes a target inclination angle calculator 93a, a feedback controller 94a, a motor control signal generator 95a, and a drive circuit 96a. The target inclination angle calculator 93a calculates a target inclination angle $\alpha 0$ of the upper member 12 in the first direction thereof based on the acceleration G1 in the first direction generated at the support apparatus 1. The feedback controller 94a calculates a control amount $\epsilon 1$ based on a difference $\Delta \alpha$ between the target inclination angle $\alpha 0$ and the actual inclination angle $\alpha$ in the first direction. The motor control signal generator 95a calculates a motor control signal Sm1 based on the control amount $\epsilon 1$. The drive circuit 96a operates in response to the motor control signal Sm1 to supply the driving power to the first controller 91.

In the same manner, the second controller 92 includes a target inclination angle calculator 93b, a feedback controller 94b, a motor control signal generator 95b, and a drive circuit 96b. The target inclination angle calculator 93b calculates a target inclination angle $\beta 0$ of the upper member 12 in the second direction thereof based on the acceleration G2 in the second direction generated at the support apparatus 1. The feedback controller 94b calculates a control amount $\epsilon 2$ based on a difference $\Delta \beta$ between the target inclination angle $\beta 0$ and the actual inclination angle $\beta$ in the second direction. The motor control signal generator 95b calculates a motor control signal Sm2 based on the control amount $\epsilon 2$. The drive circuit 96b operates in response to the motor control signal Sm2 to supply the driving power to the second controller 92.

Figure 29:
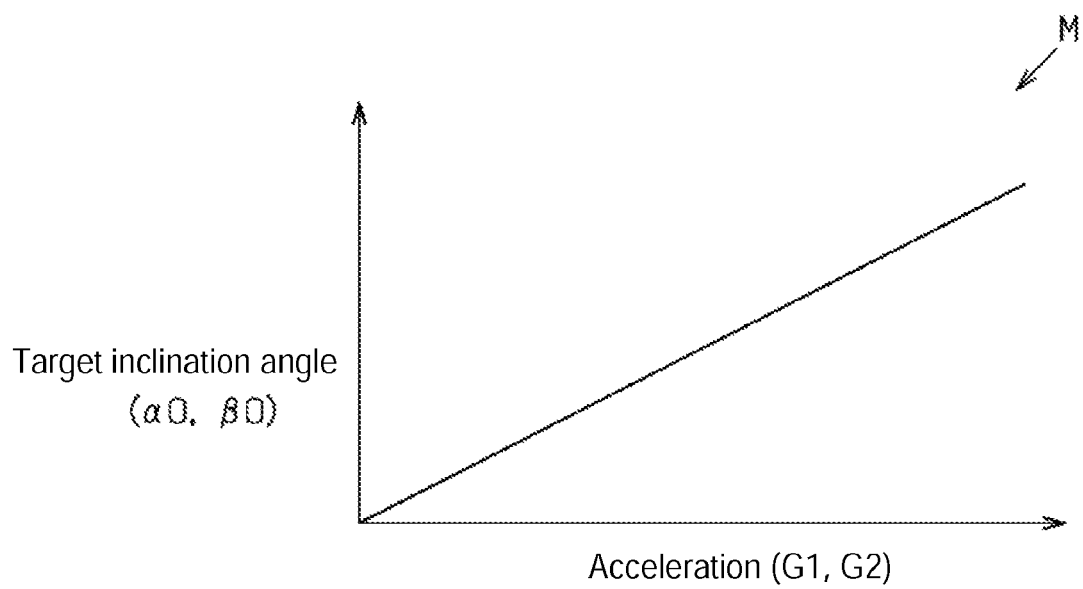
FIG. 29 is an explanatory view of a map defining a target inclination angle based on acceleration.

As illustrated in FIG. 29, the controller 80 includes a map M in a storage area, the map M specifying a relationship between the accelerations G1, G2 in the first and second directions generated at the support apparatus 1 and the target inclination angles $\alpha 0$, $\beta 0$. The map M indicates values obtained experimentally or by simulation, for example, in a linear approximation formula. The target inclination angle calculators 93a and 93b of the first and second controllers 91 and 92 calculate the target inclination angle $\alpha 0$ in the first direction and the target inclination angle $\beta 0$ in the second direction using the aforementioned map M.

As illustrated in FIGS. 16 to 19, the support apparatus 1 includes pinion gears 97a and 97b provided at the respective drive shafts 61d and 62d where the pair of first rollers 41, 41 and the pair of second rollers 42, 42 are respectively mounted. The support apparatus 1 also includes a rotation sensor 99a including a pinion gear 98a that is meshed with the pinion gear 97a, and a rotation sensor 99b including a pinion gear 98b that is meshed with the pinon gear 97b. The controller 80 detects an oscillation position of the intermediate member 13 relative to the base member 11 and an oscillation position of the upper member 12 relative to the base member 11 that supports the intermediate member 13 by counting edges of pulse signals output by the rotation sensors 99a and 99b. The rotation sensors 99a and 99b function as the inclination angle sensors 83a and 83b.

As illustrated in FIG. 3, the support apparatus 1 includes a pair of decorative panels 101, 101 mounted at the base member 11 in a detachable manner and a pair of decorative panels 102, 102 mounted at the upper member 12 in a detachable manner.

Specifically, as illustrated in FIGS. 3 and 6, longitudinal opposed ends 31e, 31e of each first rail 31 formed in a groove and extending in the first direction open to opposed side wall surfaces 11s, 11s of the base member 11, each side wall surface 11s extending or expanding in a direction orthogonal to the first direction. The decorative panels 101, 101 are fixed to the side wall surfaces 11s, 11s of the base member 11 at positions to cover the longitudinal opposed ends 31e, 31e.

As illustrated in FIGS. 3 and 9, longitudinal opposed ends 32e, 32e of each second rail 32 formed in a groove and extending in the second direction open to opposed side wall surfaces 12s, 12s of the upper member 12, each side wall surface 12s extending or expanding in a direction orthogonal to the second direction. The decorative panels 102, 102 are fixed to the side wall surfaces 12s, 12s of the upper member 12 at positions to cove the longitudinal opposed ends 32e, 32e.

The intermediate member 13 is assembled on the base member 11 in a manner that the pair of rotation members 40, 40 serving as the pair of first rollers 41, 41 is inserted from the longitudinal one ends 31e, 31e of the pair of first rails 31, 31 in a state where the decorative panels 101, 101 are removed. The upper member 12 is also assembled on the intermediate member 13 in a manner that the pair of rotation members 40, 40 serving as the pair of second rollers 42, 42 is inserted from the longitudinal one ends 32e, 32e of the pair of second rails 32, 32 in a state where the decorative panels 102, 102 are removed.

The intermediate member 13 and the upper member 12 are brought to oscillate (swingably move) in the first direction to a position where the pair of first rollers 41, 41 makes contact with either decorative panel 101 in a state where the decorative panels 101, 101 are fixed to the base member 11. The upper member 12 is also brought to oscillate (swingably move) in the second direction to a position where the pair of second rollers 42, 42 makes contact with either decorative panel 102 in a state where the decorative panels 102, 102 are fixed to the upper member 12. According to the support apparatus 1 of the embodiment, origins of oscillation positions of the upper member 12 in the first direction and the second direction, i.e., the inclination angles α, β of the upper member 12, may be simply specified.

The support apparatus 1 of the embodiment includes the base member 11, the upper member 12 supported at the upper side of the base member 11 via the intermediate member 3, the pair of first rails 31, 31 provided at the base member 11 to be positioned parallel to each other while the intermediate member 13 is disposed therebetween, and the pair of second rails 32, 32 provided at the upper member 12 to be positioned parallel to each other while the intermediate member 13 is disposed therebetween. The pair of first rails 31, 31 extends in the first direction and the pair of second rails 32, 32 extends in the second direction that is orthogonal to the first direction. The pair of first rails 31, 31 and the pair of second rails 32, 32 each include a curving form with longitudinal opposed ends curving upward. The intermediate member 13 includes the pairs of first rollers 41, 41 engaging with the pair of first rails 31, 31 and the pairs of second rollers 42, 42 engaging with the pair of second rails 32, 32 to constitute the first pendulum mechanism 51 that allows the upper member 12 to oscillate in the first direction and the second pendulum mechanism 52 that allows the upper member 12 to oscillate in the second direction. The intermediate member 13 includes the first drive portion 71 that drives and rotates the pair of first rollers 41, 41 and the second drive portion 72 that drives and rotates the pair of second rollers 42, 42.

The upper member 12 oscillates (swingably moves) in a direction where an inertia force acts in accordance with the generated acceleration, such as where a centrifugal force acts, for example, in any direction on a plane including the first direction and the second direction orthogonal to each other. Thus, the position of an object supported at the upper side of the upper member 12 may be stably retained by bringing the direction where the inertia force acts to come closer to a direction orthogonal to the mounting surface S of the upper member 12.

The intermediate member 13 including the pairs of first rollers 41, 41 and the pairs of second rollers 42, 42 functions as both a second element serving as an upper portion of the first pendulum mechanism 51 arranged below the second pendulum mechanism 52 and a first element serving as a lower portion of the second pendulum mechanism 52. In addition, the pair of first rails 31, 31 provided at the base member 11 and engaging with the pairs of first rollers 41, 41 that are provided at the intermediate member 13 is arranged to sandwich the intermediate member 13 therebetween. The pair of second rails 32, 32 provided at the upper member 12 and engaging with the pairs of second rollers 42, 42 that are provided at the intermediate member 13 is also arranged to sandwich the intermediate member 13 therebetween. Thus, dimensions of the support apparatus 1 are restrained from increasing in spite of the curving form of the first rails 31, 31 and the second rails 32, 32.

The first drive portion 71 and the second drive portion 72 provided at the intermediate member 13 drive and rotate respectively the pair of first rollers 41, 41 serving as components of the first pendulum mechanism 51 and the pair of second rollers 42, 42 serving as components of the second pendulum mechanism 52. The oscillation of the upper member 12 is actively controllable with such compact construction accordingly. The position of an object supported at the upper side of the upper member 12 may be stably held.

The base member 11 includes the first recess portion 21 opening upward and housing the intermediate member 13 in a state where the intermediate member 13 is allowed to relatively move in the first direction. The upper member 12 includes the second recess portion 22 opening downward and housing the intermediate member 13 in a state where the intermediate member 13 is allowed to relatively move in the second direction.

The base member 11 and the upper member 12 include therebetween a clearance that may be reduced while the intermediate member 13 is restrained from making contact with the base member 11 and the upper member 12. The support apparatus 1 is further downsized with reduced dimensions in the up and down direction.

The upper surface 11a of the base member 11 at which the first recess portion 21 is provided functions as the curving recess surface 55 curving in the first direction along the pair of first rails 31, 31 and in the second direction along the pair of second rails 32, 32. The lower surface 12b of the upper member 12 at which the second recess portion 22 is provided functions as the curving protrusion surface 56 curving in the second direction along the pair of second rails 32, 32 and in the first direction along the pair of first rails 31, 31.

The upper member 12 is able to oscillate (is swingably movable) in any direction on the horizontal plane including the first direction and the second direction while the curving recess surface 55 of the base member 11 and the curving protrusion surface 56 of the upper member 12 keep a predetermined clearance therebetween. The clearance between the base member 11 and the upper member 12 may be reduced while contact therebetween is avoided. The support apparatus 1 is further downsized with reduced dimensions in the up and down direction.

The pair of first rails 31, 31 is provided within the first recess portion 21 and the pair of second rails 32, 32 is provided within the second recess portion 22. The pair of first rails 31, 31 is thus restrained from protruding from the upper surface 11a of the base member 11. The pair of second rails 32, 32 is also restrained from protruding from the lower surface 12b of the upper member 12. The clearance between the base member 11 and the upper member 12 is reduced, which leads to further downsizing of the support apparatus 1 with reduced dimensions in the up and down direction.

The engagement surfaces 31a of the pair of first rails 31, 31 and the engagement surfaces 32a of the pair of second rails 32, 32 are provided with the respective rack teeth portions 75. The rotation members 40 constituting the pairs of first rollers 41, 41 and the pairs of second rollers 42, 42 are provided with the respective gear portions 76 meshed with the rack teeth portions 75.

With the gear portions 76 and the rack teeth portions 75 meshed with one another, the engagement positions of the rotation members 40 constituting the pairs of first rollers 41, 41 and the pairs of second rollers 42, 42 are stabilized accordingly. Positional error or idling of the pairs of first rollers 41, 41 and the pairs of second rollers 42, 42 relative to the pair of first rails 31, 31 and the pair of second rails 32, 32 is thus restrained, so that the pairs of first rollers 41, 41 and the pairs of second rollers 42, 42 appropriately engage with the pair of first rails 31, 31 and the pair of second rails 32, 32 respectively. The position of the intermediate member 13 supported at the upper side of the base member 11 and the position of the upper member 12 are thus stably retained. Additionally, the first pendulum mechanism 51 and the second pendulum mechanism 52 may be stably driven in accordance with the operations of the first and second drive portions 71 and 72 provided at the intermediate member 13.

Each rotation member 40 includes the protruding portion 78 axially protruding at the rotation center. The protruding portion 78 provided at each rotation member 40 constituting the first or second roller 41, 42 is configured to make slidable contact with the axially opposed wall surface 79 in a case where each pair of first rollers 41, 41 or each pair of second rollers 42, 42 is displaced in the axial direction. The position of the intermediate member 13 supported at the upper side of the base member 11 and the position of the upper member 12 are stably retained while increase of resistance in slidable movement and axial displacement of each pair of first rollers 41, 41 or each pair of second rollers 42, 42 are restrained.

The pair of first rails 31, 31 is provided at the opposed wall surfaces 21s, 21s of the first recess portion 21 extending in the first direction and the pair of second rails 32, 32 is provided at the opposed wall surfaces 22s, 22s of the second recess portion 22 extending in the second direction.

The pair of first rails 31, 31 is integrally provided at the upper member 12 and the pair of second rails 32, 32 is integrally provided at the base member 11. Thus, the support apparatus 1 may be further downsized. Additionally, with the reduced number of components, an assembly operation may be simplified and manufacturing cost may decrease.

The aforementioned embodiment may be changed or modified as explained below. The embodiment and the following modified examples may be appropriately combined.

In the embodiment, the pair of rotation members 40, 40 fixed to the opposed ends of the first support shaft 61 constitutes the pair of first rollers 41, 41 and the pair of rotation members 40, 40 fixed to the opposed ends of the second support shaft 62 constitutes the pair of second rollers 42, 42. The intermediate member 13 includes the pair of first support shafts 61, 61 and the pair of second support shafts 62, 62, which results in the two pairs of first rollers 41, 41 and the two pairs of second rollers 42, 42. Alternatively, one pair, three pairs, or more than three pairs of first rollers 41, 41 and second rollers 42, 42 may be provided.

In the embodiment, the pair of first rails 31, 31 is provided in a recess form at the opposed wall surfaces 21s, 21s of the first recess portion 21 extending in the first direction. The pair of second rails 32, 32 is also provided in a recess form at the opposed wall surfaces 22s, 22s of the second recess portion 22 extending in the second direction. Alternatively, the pair of first rails 31, 31 and the pair of second rails 32, 32 are obtainable by rail members provided separately from the base member 11 and the upper member 12 and fixed thereto. The pair of first rails 31, 31 and the pair of second rails 32, 32 may not be provided at the opposed wall surfaces 21s and 22s. For example, the pair of first rails 31, 31 and the pair of second rails 32, 32 may be obtained by rail members fixed to the bottom surface 21b of the first recess portion 21 and the bottom surface 22b of the second recess portion 22. Further, the pair of first rails 31, 31 and the pair of second rails 32, 32 may be provided outside the first recess portion 21 and the second recess portion 22.

In the embodiment, the engagement surface 31a of each first rail 31 and the engagement surface 32a of each second rail 32 are provided with the rack teeth portions 75. The rotation members 40 constituting the first rollers 41 and the second rollers 42 are provided with the gear portions 76.

At this time, all the rotation members 40 may not be provided with the gear portions 76. For example, at least the rotation members 40 mounted at the drive shafts 61d and 62d may be provided with the gear portions 76. In addition, in a case where the rotation members 40 are made of a material with less slidable ability such as rubber, for example, the gear portions 76 may not be provided at the rotation members 40 and the rack teeth portions 75 may not be provided at the engagement surfaces 31a and 32b of the first and second rails 31 and 32.

In a case where the gear portions 76 are provided at the rotation members 40 mounted at the drive shafts 61d and 62d, the gear portions 76 may rotate independently from the body portions 40x of the rotation members 40.

Figure 30:
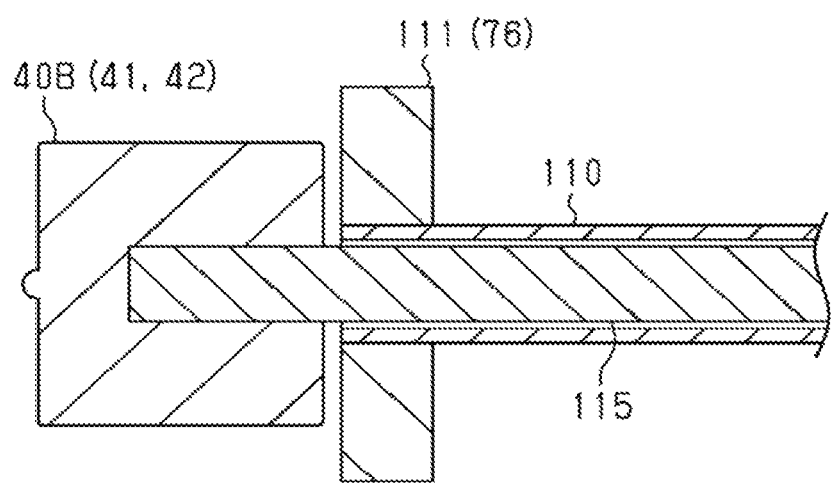
FIG. 30 is a cross-sectional view of a rotation member according to a modified example.

For example, as illustrated in FIG. 30, a pinion gear 111 corresponding to the gear portion 76 is fixed to an outer periphery of each end of a drive shaft 110 including a hollow. A support shaft 115 is arranged extending through the drive shaft 110. A rotation member 40B not provided with the gear portion 76 may be fixed at each end of the support shaft 115.

In the embodiment, the base member 11 includes the first recess portion 21 opening upward so as to accommodate therein the intermediate member 13 in a state where the intermediate member 13 is allowed to relatively move in the first direction. The upper member 12 includes the second recess portion 22 opening downward so as to accommodate therein the intermediate member 13 in a state where the intermediate member 13 is allowed to relatively move in the second direction. The upper surface 11a of the base member 11 and the lower surface 12b of the upper member 12 respectively constitute the curving recess surface 55 and the curving protrusion surface 56 in a state where the predetermined clearance is formed therebetween.

The configurations of the upper surface 11a of the base member 11 and the lower surface 12b of the upper member 12 may be appropriately changed. Additionally, the first recess portion 21 and the second recess portion 22 may not be provided at the upper surface 11a of the base member 11 and the lower surface 12b of the upper member 12. Nevertheless, the first recess portion 21 and the second recess portion 22 may be desirably provided in view of reducing the clearance between the base member 11 and the upper member 12 while avoiding contact of the intermediate member 13 relative to the base member 11 and the upper member 12. In addition, the upper surface 11a of the base member 11 and the lower surface 12b of the upper member 12 may be desirably constituted by the curving recess surface 55 and the curving protrusion surface 56 in view of reducing the clearance between the base member 11 and the upper member 12 while avoiding contact between the base member 11 and the upper member 12.

In the embodiment, the first direction and the second direction are included in the horizontal surface in the support apparatus 1. The surface including the first direction and the second direction orthogonal to each other may not be the horizontal surface. Additionally, the first direction and the second direction may not be orthogonal to each other and may be two directions intersecting with each other.

In the embodiment, the intermediate member 13 and the upper member 12 are brought to swingably move or oscillate in the first direction to the position at which the pair of first rollers 41, 41 makes contact with either one of the decorative panels 101, 101 fixed to the opposed side wall surfaces 11s, 11s of the base member 11 extending orthogonally to the first direction. Similarly, the upper member 12 is brought to swingably move or oscillate in the second direction to the position at which the pair of second rollers 42, 42 makes contact with either one of the decorative panels 102, 102 fixed to the opposed side wall surfaces 12s, 12s of the upper member 12 extending orthogonally to the second direction. The origins of the oscillation positions of the upper member 12 in the first direction and the second direction, i.e., the inclination angles α, β of the upper member 12, are specified accordingly. At this time, a method of specifying the origins for the inclination angles α, β of the upper member 12 may be appropriately changed.

In the embodiment, the flat surface 15 provided at the upper member 12 serves as the mounting surface S at the upper side of which an object is supported. The configuration and size of the mounting surface S may be appropriately changed. The object supported on the mounting surface S may be also appropriately changed. For example, the support apparatus 1 may be mounted on a vehicle floor and a seat or luggage may be supported at the upper side of the support apparatus 1. Additionally, such support apparatus 1 may include a self-operating function, for example.

According to the disclosure, a support apparatus 1 includes a base member 11, an intermediate member 13, an upper member 12 supported at an upper side of the base member 11 via the intermediate member 13, a pair of first rails 31, 31 provided at the base member 11 and arranged in parallel to each other in a state where the intermediate member 13 is disposed between the pair of first rails 31, 31, the pair of first rails 31, 31 extending in a first direction, and a pair of second rails 32, 32 provided at the upper member 12 and arranged in parallel to each other in a state where the intermediate member 13 is disposed between the pair of second rails 32, 32, the pair of second rails 32, 32 extending in a second direction orthogonal to the first direction. Each of the pair of first rails 31, 31 and the pair of second rails 32, 32 includes a curving form with longitudinal opposed ends curving upward. The intermediate member 13 includes a pair of first rollers 41, 41 engaging with the pair of first rails 31, 31 and a pair of second rollers 42, 42 engaging with the pair of second rails 32, 32. The intermediate member 13 constitutes a first pendulum mechanism 51 that allows an oscillation of the upper member 12 in the first direction. The intermediate member 13 constitutes a second pendulum mechanism 52 that allows an oscillation of the upper member 12 in the second direction. The intermediate member 13 includes a first drive portion 71 that drives the pair of first rollers 41, 41 to rotate and a second drive portion 72 that drives the pair of second rollers 42, 42 to rotate.

In addition, the base member 11 includes a first recess portion 21 opening upward and accommodating the intermediate member 13 in a state where the intermediate member 13 is allowed to relatively move in the first direction. The upper member 12 includes a second recess portion 22 opening downward and accommodating the intermediate member 13 in a state where the intermediate member 13 is allowed to relatively move in the second direction.

Further, the base member 11 includes an upper surface 11a where the first recess portion 21 is provided, the upper surface 11a serving as a curving recess surface 55 that curves in the first direction along the pair of first rails 31, 31 and curves in the second direction along the pair of second rails 32, 32. The upper member 12 includes a lower surface 12b where the second recess portion 22 is provided, the lower surface 12b serving as a curving protrusion surface 56 that curves in the second direction along the pair of second rails 32, 32 and curves in the first direction along the pair of first rails 31, 31.

Furthermore, the pair of first rails 31, 31 is arranged within the first recess portion 21 and the pair of second rails 32, 32 is arranged within the second recess portion 22.

Furthermore, the pair of first rails 31, 31 and the pair of second rails 32, 32 include engagement surfaces 31a 32a at which rack teeth portions 75 are respectively provided. The support apparatus 1 further includes rotation members 40 that include gear portions 76 meshed with the rack teeth portions 75, the rotation members 40 serving as the pair of first rollers 41, 41 and the pair of second rollers 42, 42.

Furthermore, the rotation members 40 serving as the pair of first rollers 41, 41 and the pair of second rollers 42, 42 include projecting portions 78, each of the projecting portions 78 axially projecting at a rotation center thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A support apparatus comprising:
a base member;
an intermediate member;
an upper member supported at an upper side of the base member via the intermediate member;
a pair of first rails provided at the base member and arranged in parallel to each other in a state where the intermediate member is disposed between the pair of first rails, the pair of first rails extending in a first direction; and
a pair of second rails provided at the upper member and arranged in parallel to each other in a state where the intermediate member is disposed between the pair of second rails, the pair of second rails extending in a second direction orthogonal to the first direction,
each of the pair of first rails and the pair of second rails including a curving form with longitudinal opposed ends curving upward;
the intermediate member including a pair of first rollers engaging with the pair of first rails and a pair of second rollers engaging with the pair of second rails;
the intermediate member constituting a first pendulum mechanism that allows an oscillation of the upper member in the first direction;
the intermediate member constituting a second pendulum mechanism that allows an oscillation of the upper member in the second direction;
the intermediate member including a first drive portion that drives the pair of first rollers to rotate and a second drive portion that drives the pair of second rollers to rotate.

2. The support apparatus according to claim 1, wherein the rotation members serving as the pair of first rollers and the pair of second rollers include projecting portions, each of the projecting portions axially projecting at a rotation center thereof.

3. The support apparatus according to claim 1, wherein the pair of first rails and the pair of second rails include engagement surfaces at which rack teeth portions are respectively provided,
the support apparatus further comprising rotation members that include gear portions meshed with the rack teeth portions, the rotation members serving as the pair of first rollers and the pair of second rollers.

4. The support apparatus according to claim 3, wherein the rotation members serving as the pair of first rollers and the pair of second rollers include projecting portions, each of the projecting portions axially projecting at a rotation center thereof.

5. The support apparatus according to claim 1, wherein the base member includes a first recess portion opening upward and accommodating the intermediate member in a state where the intermediate member is allowed to relatively move in the first direction,
the upper member includes a second recess portion opening downward and accommodating the intermediate member in a state where the intermediate member is allowed to relatively move in the second direction.

6. The support apparatus according to claim 5, wherein the rotation members serving as the pair of first rollers and the pair of second rollers include projecting portions, each of the projecting portions axially projecting at a rotation center thereof.

7. The support apparatus according to claim 5, the pair of first rails and the pair of second rails include engagement surfaces at which rack teeth portions are respectively provided,
the support apparatus further comprising rotation members that include gear portions meshed with the rack teeth portions, the rotation members serving as the pair of first rollers and the pair of second rollers.

8. The support apparatus according to claim 7, wherein the rotation members serving as the pair of first rollers and the pair of second rollers include projecting portions, each of the projecting portions axially projecting at a rotation center thereof.

9. The support apparatus according to claim 5, wherein the pair of first rails is arranged within the first recess portion and the pair of second rails is arranged within the second recess portion.

10. The support apparatus according to claim 9, the pair of first rails and the pair of second rails include engagement surfaces at which rack teeth portions are respectively provided,
the support apparatus further comprising rotation members that include gear portions meshed with the rack teeth portions, the rotation members serving as the pair of first rollers and the pair of second rollers.

11. The support apparatus according to claim 9, wherein the rotation members serving as the pair of first rollers and the pair of second rollers include projecting portions, each of the projecting portions axially projecting at a rotation center thereof.

12. The support apparatus according to claim 5 wherein the base member includes an upper surface where the first recess portion is provided, the upper surface serving as a curving recess surface that curves in the first direction along the pair of first rails and curves in the second direction along the pair of second rails,
the upper member includes a lower surface where the second recess portion is provided, the lower surface serving as a curving protrusion surface that curves in the second direction along the pair of second rails and curves in the first direction along the pair of first rails.

13. The support apparatus according to claim 12, wherein the pair of first rails is arranged within the first recess portion and the pair of second rails is arranged within the second recess portion.

14. The support apparatus according to claim 13, the pair of first rails and the pair of second rails include engagement surfaces at which rack teeth portions are respectively provided,
the support apparatus further comprising rotation members that include gear portions meshed with the rack teeth portions, the rotation members serving as the pair of first rollers and the pair of second rollers.

15. The support apparatus according to claim 13, wherein the rotation members serving as the pair of first rollers and the pair of second rollers include projecting portions, each of the projecting portions axially projecting at a rotation center thereof.

16. The support apparatus according to claim 12, the pair of first rails and the pair of second rails include engagement surfaces at which rack teeth portions are respectively provided, the support apparatus further comprising rotation members that include gear portions meshed with the rack teeth portions, the rotation members serving as the pair of first rollers and the pair of second rollers.

17. The support apparatus according to claim 16, wherein the rotation members serving as the pair of first rollers and the pair of second rollers include projecting portions, each of the projecting portions axially projecting at a rotation center thereof.

18. The support apparatus according to claim 12, wherein the rotation members serving as the pair of first rollers and the pair of second rollers include projecting portions, each of the projecting portions axially projecting at a rotation center thereof.

\* \* \* \* \*